US012690083B2

(12) United States Patent
Agiwal et al.

(10) Patent No.: US 12,690,083 B2
(45) Date of Patent: Jul. 21, 2026

(54) METHOD AND APPARATUS FOR HANDLING SMALL DATA TRANSMISSION IN RRC_INACTIVE STATE IN A WIRELESS COMMUNICATION SYSTEM

(71) Applicant: Samsung Electronics Co., Ltd., Suwon-si (KR)

(72) Inventors: Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 479 days.

(21) Appl. No.: 18/005,337

(22) PCT Filed: Jul. 13, 2021

(86) PCT No.: PCT/KR2021/008992
§ 371 (c)(1),
(2) Date: Jan. 12, 2023

(87) PCT Pub. No.: WO2022/015028
PCT Pub. Date: Jan. 20, 2022

(65) Prior Publication Data
US 2023/0262814 A1      Aug. 17, 2023

(30) Foreign Application Priority Data
Jul. 14, 2020      (KR) ........................ 10-2020-0086857

(51) Int. Cl.
*H04W 76/19*      (2018.01)
*H04W 28/06*      (2009.01)
(Continued)

(52) U.S. Cl.
CPC ........... *H04W 76/19* (2018.02); *H04W 28/06* (2013.01); *H04W 52/365* (2013.01);
(Continued)

(58) Field of Classification Search
None
See application file for complete search history.

(56) References Cited

U.S. PATENT DOCUMENTS

| | | | |
|---|---|---|---|
| 10,631,256 B2 | 4/2020 | Niu et al. | |
| 2019/0289661 A1 | 9/2019 | Chen | |

(Continued)

FOREIGN PATENT DOCUMENTS

| | | |
|---|---|---|
| CN | 110278612 A | 9/2019 |
| EP | 4132205 A1 | 2/2023 |

(Continued)

OTHER PUBLICATIONS

Supplementary European Search Report dated Nov. 20, 2023, in connection with European Application No. 21841225.2, 9 pages.
(Continued)

*Primary Examiner* — Christine T Duong

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides methods and apparatuses handling robust header compression (ROHC), power headroom report (PHR), and buffer status report (BSR) for data transmission in a radio resource control (RRC) inactive state in a wireless communication system.

15 Claims, 15 Drawing Sheets

(51) Int. Cl.

| | |
|---|---|
| *H04W 52/36* | (2009.01) |
| *H04W 76/20* | (2018.01) |
| *H04W 76/30* | (2018.01) |
| *H04W 74/0833* | (2024.01) |
| *H04W 74/0838* | (2024.01) |

(52) U.S. Cl.
CPC ........... *H04W 76/20* (2018.02); *H04W 76/30* (2018.02); *H04W 74/0833* (2013.01); *H04W 74/0838* (2024.01)

(56) References Cited

U.S. PATENT DOCUMENTS

| | | | |
|---|---|---|---|
| 2019/0380154 A1 | 12/2019 | Wei et al. | |
| 2020/0037210 A1 | 1/2020 | Rugeland et al. | |
| 2020/0196349 A1 | 6/2020 | He et al. | |
| 2021/0315049 A1* | 10/2021 | Wei | H04W 76/27 |
| 2021/0337602 A1* | 10/2021 | Liu | H04W 28/26 |
| 2023/0120096 A1* | 4/2023 | Kim | H04W 48/20 |
| | | | 370/329 |

FOREIGN PATENT DOCUMENTS

| | | | |
|---|---|---|---|
| WO | 2020063666 A1 | 4/2020 |
| WO | 2020087280 A1 | 5/2020 |

OTHER PUBLICATIONS

3GPP TS 36.331 V16.0.0 (Mar. 2020), Technical Specification, 3rd Generation Partnership Project; Technical Specification Group Radio Access Network; Evolved Universal Terrestrial Radio Access (E-UTRA); Radio Resource Control (RRC); Protocol specification (Release 16), Mar. 2020, 1048 pages.

International Search Report and Written Opinion of the International Searching Authority dated Oct. 27, 2021, in connection with International Application No. PCT/KR2021/008992, 8 pages.

Samsung, "Prioritization of Data in MAC PDU," R2-1906796, (Resubmission of R2-1904923), 3GPP TSG-RAN WG2 Meeting #106, Reno, Nevada, USA, May 13-17, 2019, 3 pages.

Communication pursuant to Article 94(3) EPC dated Sep. 3, 2025, in connection with European Application No. 21841225.2, 6 pages.

Office Action dated Feb. 12, 2026, in connection with Korean Application No. 10-2023-7001577, 6 pages.

Office Action dated Feb. 14, 2026, in connection with Chinese Application No. 202180060793.4, 16 pages.

\* cited by examiner

METHOD AND APPARATUS FOR HANDLING SMALL DATA TRANSMISSION IN RRC_INACTIVE STATE IN A WIRELESS COMMUNICATION SYSTEM

CROSS-REFERENCE TO RELATED APPLICATIONS

This application is a 371 National Stage of International Application No. PCT/KR2021/008992, filed Jul. 13, 2021, which claims priority to Korean Patent Application No. 10-2020-0086857, filed Jul. 14, 2020, the disclosures of which are herein incorporated by reference in their entirety.

BACKGROUND

1. Field

The disclosure relates to a wireless communication system. Specifically, the disclosure relates to an apparatus, a method and a system for handling robust header compression (ROHC), power headroom report (PHR) and buffer status report (BSR) for small data transmission in a radio resource control (RRC) inactive state in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for small data transmission in a fifth generation (5G) communication system.

In accordance with an aspect of the disclosure, a method performed by a terminal in a wireless communication system is provided. The method includes receiving, from a first cell, a radio resource control (RRC) release message configuring the terminal to enter an RRC inactive state; identifying that a criteria for initiating a small data transmission (SDT) procedure is met, while the terminal is in the RRC inactive state; re-establishing a packet data convergence protocol (PDCP) entity of a data radio bearer (DRB) for which the SDT procedure is allowed; identifying whether the RRC release message includes information indicating to continue a header compression protocol context configured for the DRB, wherein the header compression protocol context is stored in the terminal, while the terminal is in the RRC inactive state; and maintaining the header compression protocol context, in case that the RRC release message includes the information.

Further, the method includes resetting the header compression protocol context, in case that the information is not included in the RRC release message.

Further, the method includes identifying whether the RRC release message includes a list of cells for requesting to resume an RRC connection; transmitting, to a second cell, a message to resume the RRC connection; and maintaining the header compression protocol context, in case that the RRC release message includes the list of the cells and the second cell is included in the list of the cells.

Further, the method includes resetting the header compression protocol context, in case that the list of the cells is not included in the RRC release message and the second cell is different to the first cell.

Further, the method includes identifying whether the RRC release message includes an identity of a base station for requesting to resume an RRC connection; transmitting, to a second cell, a message to resume the RRC connection; and maintaining the header compression protocol context, in case that the RRC release message includes the identity of the base station and the second cell is identified by the identity of the base station.

Further, the method includes identifying that the terminal is configured with a power headroom report (PHR) configuration; identifying whether an uplink grant is for an uplink data of the SDT procedure; and transmitting the uplink data of the SDT procedure on the uplink grant without generating a PHR, in case that the uplink grant is for the SDT procedure.

Further, the method includes identifying that the terminal is configured with a buffer status report (BSR) configuration; identifying whether an uplink grant is for an uplink data of the SDT procedure; and transmit the uplink data of the SDT procedure on the uplink grant without generating a BSR, in case that the uplink grant is for the SDT procedure.

In accordance with an aspect of the disclosure, a terminal in a wireless communication system is provided. The terminal includes: a transceiver configured to transmit and receive a signal; and a controller coupled with the transceiver and configured to: receive, from a first cell, a radio resource control (RRC) release message configuring the terminal to enter an RRC inactive state, identify that a criteria for initiating a small data transmission (SDT) procedure is met, while the terminal is in the RRC inactive state, re-establish a packet data convergence protocol (PDCP) entity of a data radio bearer (DRB) for which the SDT procedure is allowed, identify whether the RRC release message includes information indicating to continue a header compression protocol context configured for the DRB, wherein the header compression protocol context is stored in the terminal, while the terminal is in the RRC inactive state, and maintain the header compression protocol context, in case that the RRC release message includes the information.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
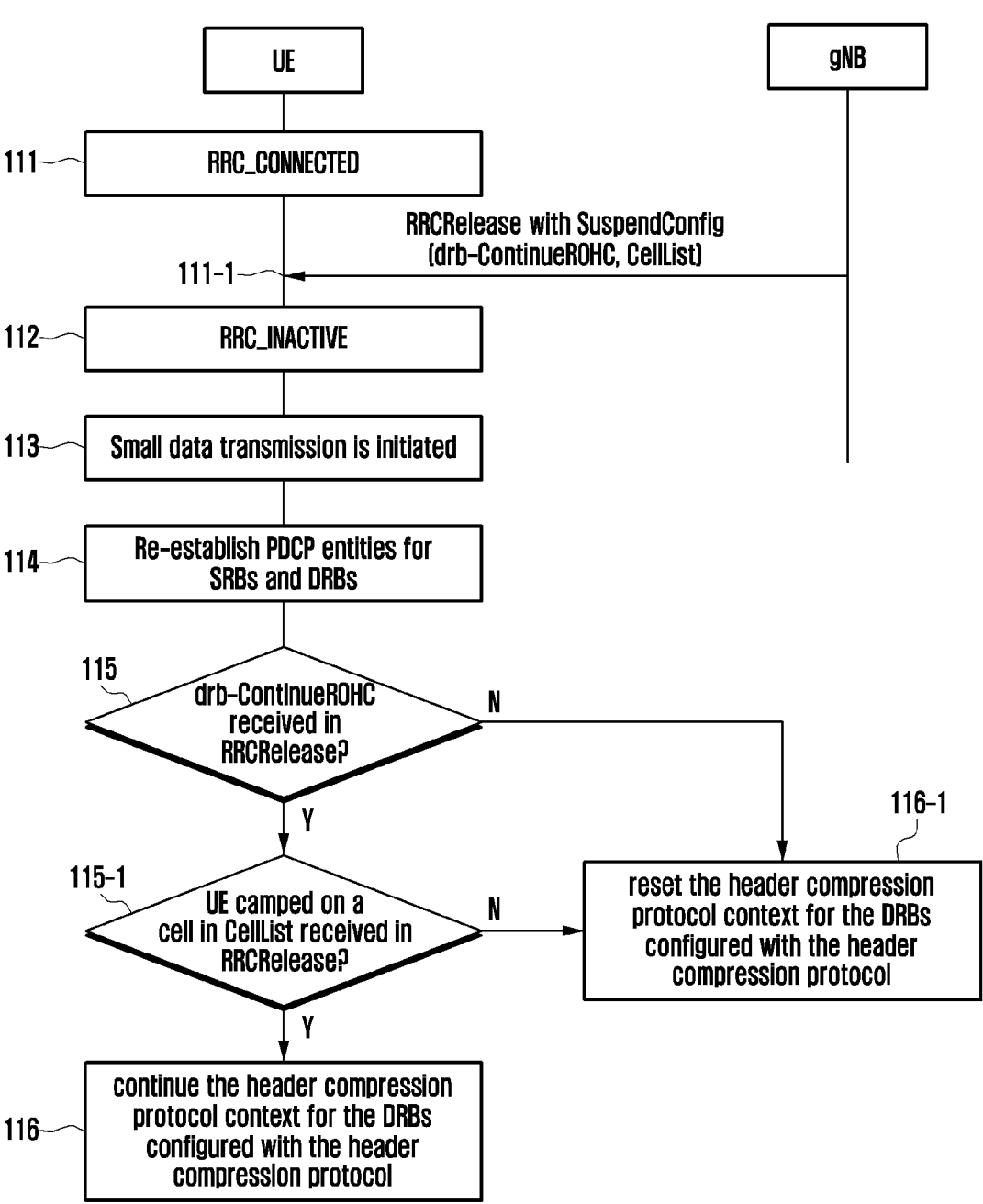
FIG. 1A illustrates one method of the disclosure for determination of whether to continue or reset the header compression protocol context upon initiation of connection resume for small data transmission.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or gNB (next generation node B).

The "UE" is an entity communicating with a BS and may be referred to as UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system (also referred as next generation radio or NR) is being developed to meet the growing demand for high speed data services, support ultra-reliability and low latency applications.

The fifth generation wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLLC), etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLLC requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (mmWave) bands, UE and gNB communicates with each other using beamforming. Beamforming techniques are used to mitigate the propagation path losses and to increase the propagation distance for communication at higher frequency band. Beamforming enhances the transmission and reception performance using a high-gain antenna. Beamforming can be classified into transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of RX beam patterns of different directions. Each of these receive patterns can be also referred as RX beam.

The fifth generation wireless communication system, supports standalone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in radio resource connected state (RRC CONNECTED) is configured to utilize radio resources provided by two distinct schedulers, located in two different nodes connected via a non-ideal backhaul and providing either Evolved Universal Mobile Telecommunications System (UMTS) Terrestrial Radio Access (E-UTRA) (i.e. if the node is an ng-eNB) or New Radio (NR) access (i.e. if the node is a gNB). In NR for a UE in RRC CONNECTED not configured with carrier aggregation/dual connectivity (CA)/DC, there is only one serving cell comprising of the primary cell (PCell). For a UE in RRC CONNECTED configured with CA/DC the term 'serving cells' is used to denote the set of cells comprising of the Special Cell (SpCell)(s) and all secondary cells (SCells). In NR the term Master Cell Group (MCG) refers to a group of serving cells associated with the Master Node, comprising of the PCell and optionally one or more SCells. In NR the term Secondary Cell Group (SCG) refers to a group of serving cells associated with the Secondary Node, comprising of the primary SCG cell (PSCell) and optionally one or more SCells. In NR PCell refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. PSCell refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

In the fifth generation wireless communication system, Physical Downlink Control Channel (PDCCH) is used to schedule downlink (DL) transmissions on physical downlink shared channel (PDSCH) and uplink (UL) transmissions on physical uplink shared channel (PUSCH), where the Downlink Control Information (DCI) on PDCCH includes: Downlink assignments containing at least modulation and coding format, resource allocation, and hybrid-automatic repeat request (ARQ) (HARQ) information related to downlink shared channel (DL-SCH); Uplink scheduling grants containing at least modulation and coding format, resource allocation, and HARQ information related to uplink shared channel (UL-SCH). In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the physical resource block(s) (PRB(s)) and orthogonal frequency division multiplexing (OFDM) symbol(s) where the UE may assume no transmission is intended for the UE; Transmission of transmission power control (TPC) commands for physical uplink control channel (PUCCH) and PUSCH; Transmission of one or more TPC commands for sounding reference signal (SRS) transmissions by one or more UEs; Switching a UE's active bandwidth part; Initiating a random access procedure. A UE monitors a set of PDCCH candidates in the configured monitoring occasions in one or more configured control resource sets (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal (DMRS). Quadrature phase shift keying (QPSK) modulation is used for PDCCH.

In fifth generation wireless communication system, a list of search space configurations are signaled by gNB for each configured BWP wherein each search configuration is uniquely identified by an identifier. Identifier of search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot),the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y*(\text{number of slots in a radio frame})+x-\text{Monitoring-offset-PDCCH-slot}) \bmod (\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the identifier of CORESET configuration associated with it. A list of CORESET configurations are signaled by gNB for each configured BWP wherein each CORESET configuration is uniquely identified by an identifier. Note that each radio frame is of 10 ms duration. Radio frame is identified by a radio frame number or system frame number (SFN). Each radio frame comprises of several slots wherein the number of slots in a radio frame and duration of slots depends on sub carrier spacing. The number of slots in a radio frame and duration of slots depends radio frame for each supported subcarrier spacing (SCS) is pre-defined in NR. Each CORESET configuration is associated with a list of TCI (Transmission configuration indicator) states. One DL reference signal (RS) ID (either SSB or channel state information (CSI) RS (CSI-RS)) is configured per TCI state. The list of TCI states corresponding to a CORESET configuration is signaled by gNB via RRC signaling. One of the TCI state in TCI state list is activated and indicated to UE by gNB. TCI state indicates the DL TX beam (DL TX beam is quasi-co-located (QCLed) with SSB/CSI RS of TCI state) used by gNB for transmission of PDCCH in the PDCCH monitoring occasions of a search space.

In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In RRC connected state, UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the medium access control (MAC) entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the 5G wireless communication system, random access (RA) is supported. Random access (RA) is used to achieve UL time synchronization. RA is used during initial access, handover, radio resource control (RRC) connection re-establishment procedure, scheduling request transmission, secondary cell group (SCG) addition/modification, beam failure recovery and data or control information transmission in UL by non-synchronized UE in RRC CONNECTED state. Several types of random access procedure is supported such as contention based random access and contention free random access, and each of these can be one of 2 step or 4 step random access.

In the fifth generation wireless communication system, RRC can be in one of the following states: RRC_IDLE, RRC_INACTIVE, and RRC_CONNECTED. A UE is either in RRC_CONNECTED state or in RRC_INACTIVE state when an RRC connection has been established. If this is not the case, i.e. no RRC connection is established, the UE is in RRC_IDLE state. The RRC states can further be characterized as follows:

In RRC_IDLE state, a UE specific DRX may be configured by upper layers (i.e. NAS). The UE, monitors Short Messages transmitted with paging-radio network temporary identifier (P-RNTI) over DCI; monitors a Paging channel for CN paging using 5G-S-TMSI; performs neighboring cell measurements and cell (re-) selection; acquires system information and can send SI request (if configured); performs logging of available measurements together with location and time for logged measurement configured UEs.

In RRC INACTIVE state, a UE specific DRX may be configured by upper layers or by RRC layer; UE stores the UE Inactive AS context. A RAN-based notification area is configured by RRC layer. The UE monitors Short Messages transmitted with P-RNTI over DCI; monitors a Paging channel for CN paging using 5G-S-TMSI and RAN paging using full inactive-radio network temporary identifier (I-RNTI); performs neighboring cell measurements and cell (re-)selection; performs RAN-based notification area updates periodically and when moving outside the configured RAN-based notification area; acquires system information and can send SI request (if configured); performs logging of available measurements together with location and time for logged measurement configured UEs.

In the RRC_CONNECTED, the UE stores the AS context and transfer of unicast data to/from UE takes place. The UE monitors Short Messages transmitted with P-RNTI over DCI, if configured; monitors control channels associated with the shared data channel to determine if data is scheduled for it; provides channel quality and feedback information; performs neighbouring cell measurements and measurement reporting; acquires system information.

In the RRC_CONNECTED, network may initiate suspension of the RRC connection by sending RRCRelease with suspend configuration. When the RRC connection is suspended, the UE stores the UE Inactive AS context and any configuration received from the network, and transits to RRC_INACTIVE state. If the UE is configured with SCG, the UE releases the SCG configuration upon initiating a RRC Connection Resume procedure. The RRC message to suspend the RRC connection is integrity protected and ciphered.

The resumption of a suspended RRC connection is initiated by upper layers when the UE needs to transit from RRC_INACTIVE state to RRC_CONNECTED state or by RRC layer to perform a RNA update or by RAN paging from NG-RAN. When the RRC connection is resumed, network configures the UE according to the RRC connection resume procedure based on the stored UE Inactive AS context and any RRC configuration received from the network. The RRC connection resume procedure re-activates AS security and re-establishes SRB(s) and DRB(s). In response to a request to resume the RRC connection, the network may resume the suspended RRC connection and send UE to RRC_CON- NECTED, or reject the request to resume and send UE to RRC_INACTIVE (with a wait timer), or directly re-suspend the RRC connection and send UE to RRC_INACTIVE, or directly release the RRC connection and send UE to RRC_IDLE, or instruct the UE to initiate NAS level recovery (in this case the network sends an RRC setup message).

Upon initiating the resume procedure, UE:

apply the default L1 parameter values as specified in corresponding physical layer specifications, except for the parameters for which values are provided in SIB1;

apply the default MAC Cell Group configuration apply the CCCH configuration start timer T319;

apply the timeAlignmentTimerCommon included in SIB1 apply the default SRB1 configuration set the variable pendingRNA-Update to false;

initiate transmission of the RRCResumeRequest message or RRCResumeRequest1 restore the RRC configuration, RoHC state, the stored QoS flow to DRB mapping rules and the $K_{gNB}$ and $K_{RRCint}$ keys from the stored UE Inactive AS context except for the following:

masterCellGroup;

mrdc-SecondaryCellGroup, if stored; and pdcp-Config;

set the resumeMAC-I to the 16 least significant bits of the MAC-I calculated:

2>over the ASN.1 encoded as per clause 8 (i.e., a multiple of 8 bits) VarResumeMAC-Input;

2>with the $K_{RRCint}$ key in the UE Inactive AS Context and the previously configured integrity protection algorithm; and 2>with all input bits for COUNT, BEARER and DIRECTION set to binary ones;

derive the $K_{gNB}$ key based on the current $K_{gNB}$ key or the NH, using the stored nextHopChainingCount value;

derive the $K_{RRCenc}$ key, the $K_{RRCint}$ key, the $K_{UPint}$ key and the $K_{UPenc}$ key;

configure lower layers to apply integrity protection for all signaling radio bearers except SRB0 using the configured algorithm and the $K_{RRCint}$ key and $K_{UPint}$ key, i.e., integrity protection shall be applied to all subsequent messages received and sent by the UE;

configure lower layers to apply ciphering for all signaling radio bearers except SRB0 and to apply the configured ciphering algorithm, the $K_{RRCenc}$ key and the $K_{UPenc}$ key derived in this subclause, i.e. the ciphering configuration shall be applied to all subsequent messages received and sent by the UE;

re-establish PDCP entities for SRB1;

resume SRB1;

transmit RRCResumeRequest or RRCResumeRequest1.

There are several issues on the current resume procedure in 5G wireless communication systems.

In the current connection resume procedure in 5G wireless communication system, only SRB0 and SRB1 are resumed upon initiating the connection resume. After receiving RRCResume from gNB, UE re-establishes PDCP entities for DRBs and resumes DRBs. RoHC context of DRB(s) is continued if drb-ContinueROHC is received in RRCResume. Otherwise it is reset.

5G wireless communication system is being enhanced to enable UL small data transmission in RRC_INACTIVE. UL data can be transmitted in Msg3/MsgA/Preconfigured PUSCH Resource. Upon completion of UL data transmission, UE remains in RRC_INACTIVE.

For connection resumption initiated for small data transmission, DRB(s) also needs to be resumed before transmitting RRCResumeRequest/RRCResumeRequest1, so that multiplexing entity in MAC can include MAC SDU(s) from DRB(s) in Msg3/MsgA/Preconfigured PUSCH Resource. UE also needs to determine whether to reset the header compression protocol context or continue the header compression protocol context for DRB(s). The issue is how UE determines whether to reset the header compression protocol context or not when the connection resumption initiated for small data transmission.

Also, in the current connection resume procedure in 5G wireless communication system, UE applies the default MAC Cell Group configuration upon initiating the connection resume. Applying default MAC Cell Group configuration results in MAC entity generating PHR.

For connection resumption initiated for small data transmission, Msg3/MsgB MAC PDU or MAC PDU in pre-configured UL grant should include CCCH SDU +DTCH SDU. The consequence of applying default MAC configuration is that PHR is triggered and included ahead of DTCH SDU in Msg3/MsgB or pre-configured UL grant as the PHR has higher priority than DTCH SDU. As a result, some of DTCH data may not be included in Msg3/MsgB MAC PDU or MAC PDU in pre-configured UL grant.

Operation upon Resumption of RRC Connection
for Small Data Transmission in RRC_INACTIVE UE is in RRC_CONNECTED state. In the RRC_CONNECTED state, the UE receives RRCRelease message with suspend configuration from gNB. Upon receiving the RRCRelease message with suspend configuration the UE enters RRC_INACTIVE state and perform the following operations: the UE reset MAC and release the default MAC Cell Group configuration, if any. The UE re-establishes RLC entities for SRB1. The UE stores in the UE Inactive AS Context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync IE and servingCellConfigCommonSIB IE received in RRCReconfiguration message while the UE was in RRC_CONNECTED state. The UE also stores next hopping chain count (NCC) and other parameters received in RRCRelease message. The UE suspend all SRB(s) and DRB(s), except SRB0.

In the RRC_INACTIVE state UE ensures having valid version of SIB1 from the camped cell. In the RRC_INACTIVE state, UE initiates RRC connection resumption for small data transmission (if criteria (e.g. RSRP is above a threshold and available data volume for transmission is smaller than a threshold and data is available for transmission in RBs for which SDT is allowed and/or connection resumption trigger is received from upper layer i.e. NAS by RRC) to perform small data transmission is met). RRC connection resumption for small data transmission may also be referred as small data transmission procedure. Upon initiation of RRC connection resumption for small data transmission or upon initiation of small data transmission procedure, UE performs the following operations apply the default L1 parameter values as specified in corresponding physical layer specifications, except for the parameters for which values are provided in SIB1;

apply the default MAC Cell Group configuration apply the CCCH configuration start timer T319;

apply the timeAlignmentTimerCommon included in SIB1 apply the default SRB1 configuration set the variable pendingRNA-Update to false;

initiate transmission of the RRCResumeRequest message or RRCResumeRequest1 if field useFullResumeID is signalled in SIB1:

select RRCResumeRequest1 as the message to use;

set the resumeIdentity to the stored fullI-RNTI value;

else:

select RRCResumeRequest as the message to use;

set the resumeIdentity to the stored shortI-RNTI value;

restore the RRC configuration, RoHC state, the stored QoS flow to DRB mapping rules and the $K_{gNB}$ and $K_{RRCint}$ keys from the stored UE Inactive AS context except for the following:

masterCellGroup;

mrdc-SecondaryCellGroup, if stored; and pdcp-Config;

set the resumeMAC-I to the 16 least significant bits of the MAC-I calculated:

2>over the ASN.1 encoded as per clause 8 (i.e., a multiple of 8 bits) VarResumeMAC-Input;

2>with the $K_{RRCint}$ key in the UE Inactive AS Context and the previously configured integrity protection algorithm; and 2>with all input bits for COUNT, BEARER and DIRECTION set to binary ones;

derive the new $K_{gNB}$ key based on the current $K_{gNB}$ key or the NH, using the stored nextHopChainingCount (NCC) value;

derive the $K_{RRCenc}$ ~key, the $K_{RRCint}$ key, the $K_{UPint}$ key and the $K_{UPenc}$ key;

configure lower layers to apply integrity protection for all radio bearers except SRB0 using the configured algorithm and the $K_{RRCint}$ key and $K_{UPint}$ key, i.e., integrity protection shall be applied to all subsequent messages and user data received and sent by the UE; However, only DRBs with previously configured UP integrity protection shall resume integrity protection.

configure lower layers to apply ciphering for all radio bearers except SRB0 and to apply the configured ciphering algorithm, the $K_{RRCenc}$ key and the $K_{UPenc}$ key derived above, i.e. the ciphering configuration shall be applied to all subsequent messages and data received and sent by the UE;

In an embodiment, UE re-establish PDCP entities for all SRBs and all DRBs (or re-establish PDCP entities for SRB1 and all DRBs) of MCG; UE does not resume SRB3 and DRBs of SCG. Note that UE applies the PDCP configuration from stored AS context for the re-established PDCP entities of DRBs and SRB2. In an embodiment, whether to apply PDCP configuration from stored AS context or apply default PDCP configuration can be indicated by gNB in RRCRelease message or RRCReconfiguration message and UE applies PDCP configuration from stored AS context or apply default PDCP configuration accordingly for the re-established PDCP entities of DRBs and SRB2.

In an embodiment, UE re-establish RLC entities for DRBs (note that RLC entities for SRB1 is re-established when UE enters inactive state). Note that UE applies the RLC configuration from stored AS context for the re-established RLC entities of DRBs and SRB2. In an embodiment, whether to apply RLC configuration from stored AS context or apply default RLC configuration can be indicated by gNB in RRCRelease message or RRCReconfiguration message and UE applies RLC configuration from stored AS context or apply default RLC configuration accordingly for the re-established RLC entities of DRBs and SRB2.

It is to be noted that upon initiation of normal connection resume procedure i.e. connection resume procedure not initiated for small data transmission, UE does not resume and re-establishes DRBs and SRB2 (i.e. does not re-establish PDCP/RLC entities of DRBs and SRB2). These are resumed and re-established only upon receiving RRCResume message from gNB during the connection resume procedure (after transmitting RRCResumeRequest).

UE restore the ROHC state as explained later in this disclosure

In an embodiment, resume all SRBs and all DRBs (or resume SRB 1 and all DRBs) of MCG; UE does not resume and re-establish PDCP/RLC entities of SRB3 and DRBs of SCG.

Upon initiating connection resume for small data transmission, at which point in time will PDCP provide DTCH SDU(s) to the lower layer, also needs to be specified. RRC can indicate this to PDCP upon resumption of DRBs.

transmit RRCResumeRequest or RRCResumeRequest1. The user data are ciphered and integrity protected (Only for DRBs configured with UP integrity protection) and transmitted on DTCH multiplexed with the RRCResumeRequest/RRCResumeRequest1 message on CCCH0/CCCH1 respectively. Some assistance information can also be included like BSR (regular or truncated); or a New MAC CE indicating UE has more UL data or UE expects DL data in response to UL Data and/or including SS-RSRP or CQI; or indication in RRC message indicating UE has more UL data or UE expects DL data in response to UL Data.

In an embodiment, UE resumes SRB 1 and instead of resuming all DRBs and re-establishing PDCP/RLC entities for all DRBs in the above operation (i.e. for small data transmission procedure), UE resumes and re-establishes PDCP/RLC entities of only those DRBs for which small data transmission is allowed. DRBs refer to dedicated radio bearer whose configuration is received from gNB such as signaling radio bearer 2 (SRB2) and data radio bearers.

In an embodiment, The RBs (i.e. signaling radio bearer 2 and data radio bearers) for which small data transmission is allowed can be signaled by gNB (e.g. in RRCRelease message or any other RRC signaling message such as RRCReconfiguration message). These messages can be received in RRC_CONNECTED state. These messages can also be received in RRC_I-NATCIVE state during the small data transmission procedure and received configuration is applied in next small data transmission procedure. One or more RB identities of RBs for which small data transmission is allowed can be included in RRCRelease message. Alternately, there can be an indicator (e.g., SDTAl-lowed set to TRUE) in configuration of RB which indicates that SDT is allowed for that RB. If SDTAl-lowed is set to FALSE or is not included, UE assumes that SDT is not allowed for that RB.

This information about which RBs (SRB2 and DRBs) small data transmission is allowed is stored in UE's AS context in RRC_INATCIVE and is used by UE to decide which RBs to resume and re-establish upon initiation of small data transmission procedure.

In an embodiment, a DRB is considered as allowed for small data transmission if data from LCH of this DRB is allowed to be transmitted according to LCH restrictions (allowedSCS-List, maxPUSCH-Duration, configured-GrantType1Allowed, allowedServingCells, allowedCG-List and allowedPHY-PriorityIndex) in the UL grant for small data transmission. One or more LCH restrictions are configured in LCH configuration of LCH associated with DRB. allowedSCS-List sets the allowed Subcarrier Spacing(s) for transmission. maxPUSCH-Duration which sets the maximum PUSCH duration allowed for transmission; configuredGrantType1Allowed which sets whether a configured grant Type 1 can be used for transmission; allowed-ServingCells which sets the allowed cell(s) for transmission; allowedCG-List which sets the allowed configured grant(s) for transmission; allowedPHY-PriorityIndex which sets the allowed PHY priority index(es) of a dynamic grant for transmission. For example, if SCS for UL grant for small data transmission is SCS X and LCH for a DRB is configured with allowedSCS-List wherein SCS X is not included in allowedSCS-List, the DRB is not considered for small data transmission.

Header Compression Protocol Context Resumption/Reset Determination

FIG. 1A to 8 illustrates various methods for determination of whether to continue or reset the header compression protocol context upon initiation of connection resume for small data transmission. RRC connection resumption for small data transmission may also be referred as small data transmission procedure. Various methods of the present disclosure will be described in detail with reference to the figures. The following methods are illustrative for various embodiments of the disclosure, and may be modified or combined with each other by those skilled in the art.

Method 1A: In one method of this disclosure, upon initiation of connection resume for small data transmission, for DRBs which are resumed (as explained earlier), determination of whether to continue or reset the header compression protocol context if DRB is configured with the header compression protocol is illustrated in FIG. 1A. Whether DRB is configured with header compressed protocol is known from the DRB configuration stored by UE in stored AS context when UE entered the RRC_INATCIVE state.

1. UE is in RRC_CONNECTED (111). In the RRC_CONNECTED, UE receives RRCRelease with suspend configuration (111-1). drb-ContinueROHC (common for all DRBs) may be received in RRCRelease message. The list of cells (e.g. PCIs or Cell identities) where UE can continue ROHC may also be received in RRCRelease message.

2. Upon receiving RRCRelease with suspend configuration, UE enters RRC_INACTIVE (112) and performs the following operations:

reset MAC and release the default MAC Cell Group configuration, if any;

re-establish RLC entities for SRB1;

UE store in the UE Inactive AS Context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB received in RRCReconfiguration message while the UE was in RRC_CONNECTED state. The UE also stores next hopping chain count (NCC) and other parameters received in RRCRelease message.

suspend all SRB(s) and DRB(s), except SRB0;

3. During the RRC_INACTIVE, UE initiates RRC connection resumption for small data transmission when criteria (e.g. RSRP is above a threshold and available data volume for transmission is smaller than a threshold and data is available for transmission in RBs for which SDT is allowed and/or connection resumption trigger is received from upper layer i.e. NAS by RRC) to perform small data transmission is met (113). Note that at the time of RRC connection resumption for small data transmission UE can be camped on a cell which is different from cell from which it has received RRCRelease message in step 1.

4. UE re-establishes PDCP entities for SRB(s) and DRB(s) as explained earlier and perform other operations as described in the above section "Operation upon resumption of RRC Connection for small data transmission in RRC INACTIVE" (114).

5. If drb-ContinueROHC has been received in immediately preceding RRCRelease message (or in RRCRelease message suspending the last RRC connection) (115), and the UE is requesting to resume RRC connection for small data transmission in one of the cell in the cell list received in the RRCRelease message (115-1):

continue the header compression protocol context for the DRBs configured with the header compression protocol (116)

else:

reset the header compression protocol context for the DRBs configured with the header compression protocol (116-1)

In the above operation, RRC message (e.g. RRCReconfiguration message) other than RRCRelease message can also be used. In an embodiment of the above operation, drb-ContinueROHC can be signaled separately for each DRB in RRCRelease/RRC message. In this case, at step 5 the operation will be as follows:

If drb-ContinueROHC has been received in immediately preceding RRCRelease message (or in RRCRelease message suspending the last RRC connection) for a DRB configured with the header compression protocol and the UE is requesting to resume RRC connection for small data transmission in one of the cell in the cell list received in the RRCRelease message, continue the header compression protocol context for that DRB. Otherwise, reset the header compression protocol context for that DRB.

Figure 1B:
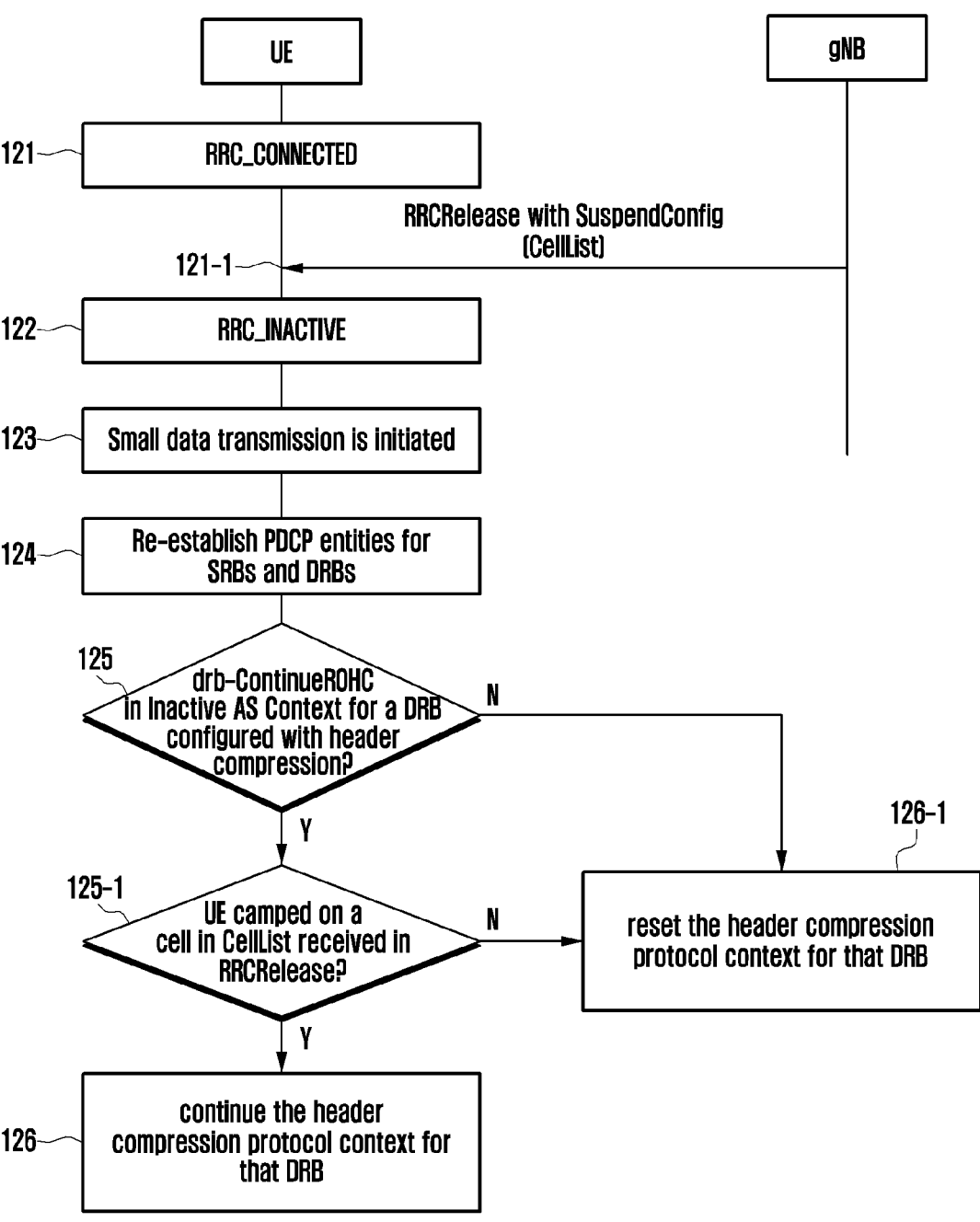
FIG. 1B illustrates another method of the disclosure for determination of whether to continue or reset the header compression protocol context upon initiation of connection resume for small data transmission.

Method 1B: In one method of this disclosure, upon initiation of connection resume for small data transmission, for DRBs which are resumed (as explained earlier), determination of whether to continue or reset the header compression protocol context if DRB is configured with the header compression protocol is illustrated in FIG. 1B. Whether DRB is configured with header compressed protocol is known from the DRB configuration stored by UE in stored AS context when UE entered the RRC_INATCIVE state.

1. UE is in RRC_CONNECTED (121). In the RRC_CONNECTED, UE receives RRCRelease with suspend configuration (121-1). The list of cells (e.g. PCIs or Cell identities) where UE can continue ROHC may be received in RRCRelease message.

2. Upon receiving RRCRelease with suspend configuration, UE enters RRC_INACTIVE (122) and performs the following operations:

reset MAC and release the default MAC Cell Group configuration, if any;

re-establish RLC entities for SRB1;

UE store in the UE Inactive AS Context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB received in RRCReconfiguration message while the UE was in RRC_CONNECTED state. The UE also stores next hopping chain count (NCC) and other parameters received in RRCRelease message.

suspend all SRB(s) and DRB(s), except SRB0;

3. During the RRC_INACTIVE, UE initiates RRC connection resumption for small data transmission when criteria (e.g. RSRP is above a threshold and available data volume for transmission is smaller than a threshold and data is available for transmission in RBs for which SDT is allowed and/or connection resumption trigger is received from upper layer i.e. NAS by RRC) to perform small data transmission is met (123). Note that at the time of RRC connection resumption for small data transmission UE can be camped on a cell which is different from cell from which it has received RRCRelease message in step 1.

4. UE re-establishes PDCP entities for SRB(s) and DRB(s) as explained earlier and perform other operations as described in the above section "Operation upon resumption of RRC Connection for small data transmission in RRC_I-NACTIVE" (124).

5. For each DRB being re-established:

In the Inactive AS Context, if DRB is configured with header compression protocol and drb-ContinueROHC is configured in the PDCP configuration of the DRB (125) and the UE is requesting to resume RRC connection for small data transmission in one of the cell in the cell list received in the RRCRelease message (125-1):

continue the header compression protocol context for that DRB (126) else:

reset the header compression protocol context for that DRB (126-1)

Figure 2:
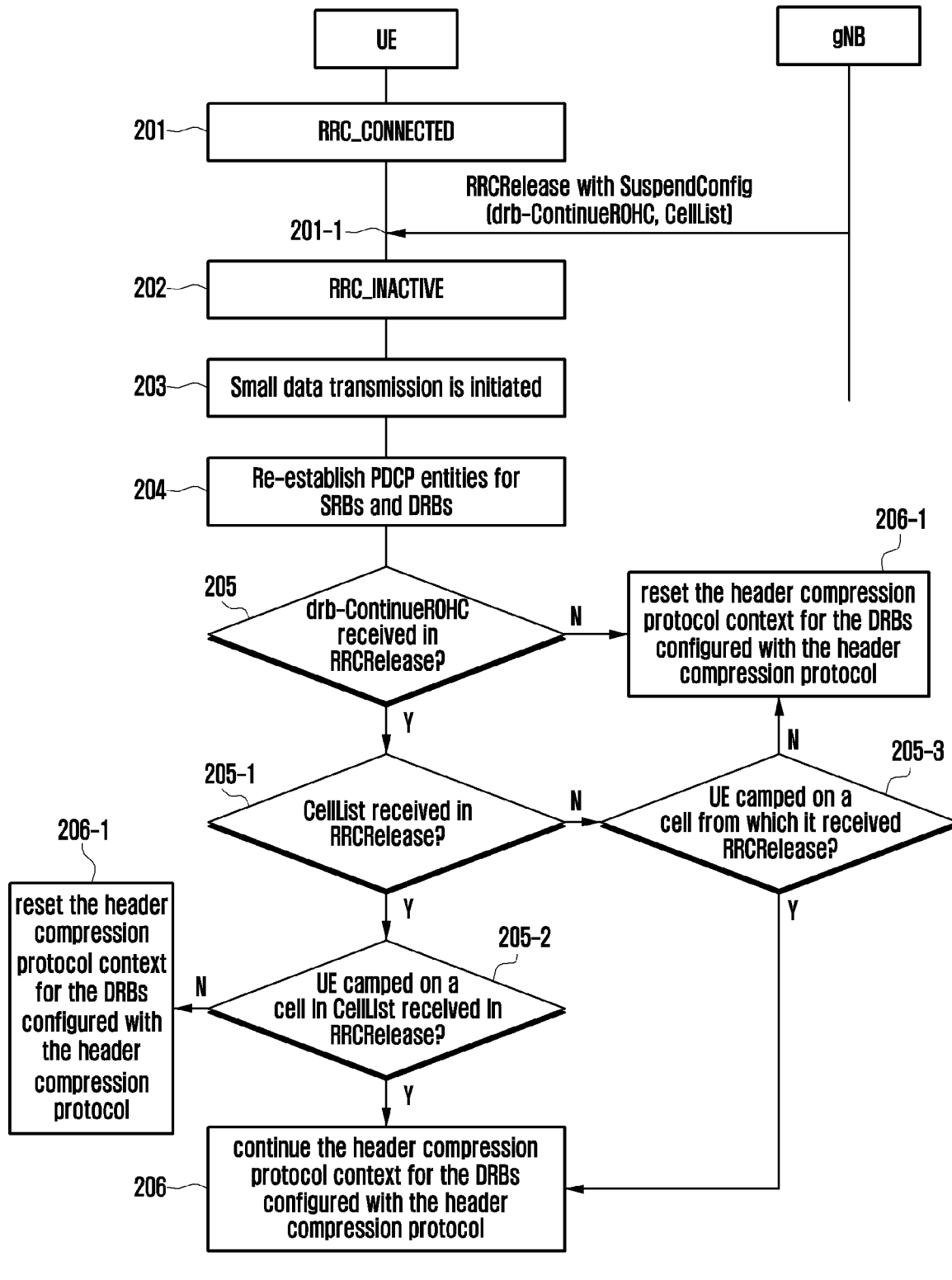
FIG. 2 illustrates another method of the disclosure for determination of whether to continue or reset the header compression protocol context upon initiation of connection resume for small data transmission.

Method 2A: In another method of this disclosure, upon initiation of connection resume for small data transmission, for DRBs which are resumed (as explained earlier), determination of whether to continue or reset the header compression protocol context if DRB is configured with the header compression protocol is illustrated in FIG. 2. Whether DRB is configured with header compressed protocol is known from the DRB configuration stored by UE in stored AS context when UE entered the RRC_INATCIVE state.

1. UE is in RRC_CONNECTED (201). In the RRC_CONNECTED, UE receives RRCRelease with suspend configuration (201-1). drb-ContinueROHC (common for all DRBs) may be received in RRCRelease message. The list of cells (e.g. PCIs or Cell identities) where UE can continue ROHC may also be received in RRCRelease message.

2. Upon receiving RRCRelease with suspend configuration, UE enters RRC_INACTIVE (202) and performs the following operations:

reset MAC and release the default MAC Cell Group configuration, if any;

re-establish RLC entities for SRB1;

UE store in the UE Inactive AS Context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB received in RRCReconfiguration message while the UE was in RRC_CONNECTED state. The UE also stores next hopping chain count (NCC) and other parameters received in RRCRelease message.

suspend all SRB(s) and DRB(s), except SRB0;

3. During the RRC_INACTIVE, UE initiates RRC connection resumption for small data transmission when criteria (e.g. RSRP is above a threshold and available data volume for transmission is smaller than a threshold and data is available for transmission in RBs for which SDT is allowed and/or connection resumption trigger is received from upper layer i.e. NAS by RRC) to perform small data transmission is met (203). Note that at the time of RRC connection resumption for small data transmission UE can be camped on a cell which is different from cell from which it has received RRCRelease message in step 1.

4. UE re-establishes PDCP entities for SRB(s) and DRB(s) as explained earlier and perform other operations as described in the above section "Operation upon resumption of RRC Connection for small data transmission in RRC_I-NACTIVE" (204).

5. If drb-ContinueROHC has been received in immediately preceding RRCRelease message (or in RRCRelease message suspending the last RRC connection) (205):

If UE is requesting to resume RRC connection for small data transmission in one of the cell (205-2) in the cell list received in the RRCRelease message (205-1); or If cell list is not received in the RRCRelease message and if UE is requesting to resume RRC connection for small data transmission in the same cell (i.e. cell from which it has received RRCRelease message) (205-3):

continue the header compression protocol context for the DRBs configured with the header compression protocol (206)

else:

reset the header compression protocol context for the DRBs configured with the header compression protocol (206-1)

6. else (If drb-ContinueROHC has not been received in immediately preceding RRCRelease message (or in RRCRelease message suspending the last RRC connection)):

reset the header compression protocol context for the DRBs configured with the header compression protocol (206-1)

In the above operation, RRC message (e.g. RRCReconfiguration message) other than RRCRelease message can also be used. In an embodiment of the above operation, drb-ContinueROHC can be signaled separately for each DRB in RRCRelease/RRC message. In this case, at step 5/6 the operation will be as follows:

If drb-ContinueROHC has been received in immediately preceding RRCRelease message (or in RRCRelease message suspending the last RRC connection) for a DRB configured with the header compression protocol:

If UE is requesting to resume RRC connection for small data transmission in one of the cell in the cell list received in the RRCRelease message; or If cell list is not received in the RRCRelease message and if UE is requesting to resume RRC connection for small data transmission in the same cell (i.e. cell from which it has received RRCRelease message):

continue the header compression protocol context for that DRB else:

reset the header compression protocol context for that DRB else (If drb-ContinueROHC has not been received in immediately preceding RRCRelease message (or in RRCRelease message suspending the last RRC connection) for a DRB configured with the header compression protocol:

reset the header compression protocol context for that DRB

In the above operation, RRC message (e.g. RRCReconfiguration message) other than RRCRelease message can also be used.

Method 2B: In another method of this disclosure, upon initiation of connection resume for small data transmission, for DRBs which are resumed (as explained earlier), determination of whether to continue or reset the header compression protocol context if DRB is configured with the header compression protocol is illustrated below. Whether DRB is configured with header compressed protocol is known from the DRB configuration stored by UE in stored AS context when UE entered the RRC_INATCIVE state.

1. UE is in RRC_CONNECTED. In the RRC_CONNECTED, UE receives RRCRelease with suspend configuration. The list of cells (e.g. PCIs or Cell identities) where UE can continue ROHC may be received in RRCRelease message optionally.

2. Upon receiving RRCRelease with suspend configuration, UE enters RRC INACTIVE and performs the following operations:

reset MAC and release the default MAC Cell Group configuration, if any;

re-establish RLC entities for SRB1;

UE store in the UE Inactive AS Context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB received in RRCReconfiguration message while the UE was in RRC_CONNECTED state. The UE also stores next hopping chain count (NCC) and other parameters received in RRCRelease message.

suspend all SRB(s) and DRB(s), except SRB0;

3. During the RRC_INACTIVE, UE initiates RRC connection resumption for small data transmission when criteria (e.g. RSRP is above a threshold and available data volume for transmission is smaller than a threshold and data is available for transmission in RBs for which SDT is allowed and/or connection resumption trigger is received from upper layer i.e. NAS by RRC) to perform small data transmission is met. Note that at the time of RRC connection resumption for small data transmission UE can be camped on a cell which is different from cell from which it has received RRCRelease message in step 1.

4. UE re-establishes PDCP entities for SRB(s) and DRB(s) as explained earlier and perform other operations as described in the above section "Operation upon resumption of RRC Connection for small data transmission in RRC_INACTIVE".

In the Inactive AS Context, if DRB is configured with header compression protocol and drb-ContinueROHC is configured in the PDCP configuration of the DRB and the UE is requesting to resume RRC connection for small data transmission in one of the cell in the cell list received in the RRCRelease message:

5. For each DRB being re-established:

In the Inactive AS Context, if DRB is configured with header compression protocol and drb-ContinueROHC is configured in the PDCP configuration of the DRB:

If UE is requesting to resume RRC connection for small data transmission in one of the cell in the cell list received in the RRCRelease message; or If cell list is not received in the RRCRelease message and if UE is requesting to resume RRC connection for small data transmission in the same cell (i.e. cell from which it has received RRCRelease message):

continue the header compression protocol context for that DRB else:

reset the header compression protocol context for that DRB else (In the Inactive AS Context, if DRB is configured with header compression protocol and drb-ContinueROHC is not configured in the PDCP configuration of the DRB):

reset the header compression protocol context for that DRB

Figure 3:
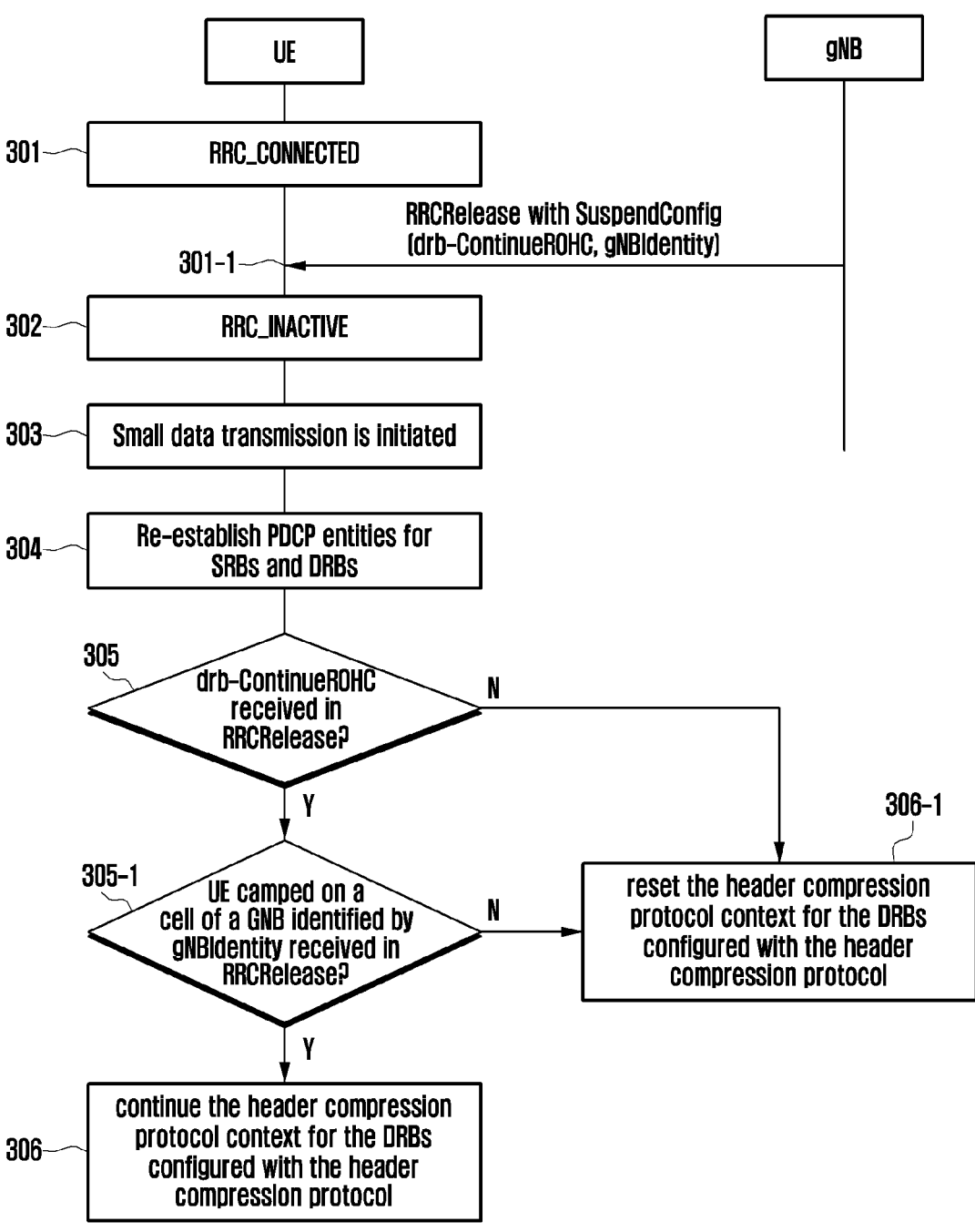
FIG. 3 illustrates another method of the disclosure for determination of whether to continue or reset the header compression protocol context upon initiation of connection resume for small data transmission.

Method 3A: In yet another method of this disclosure, upon initiation of connection resume for small data transmission, for DRBs which are resumed (as explained earlier), determination of whether to continue or reset the header compression protocol context if DRB is configured with the header compression protocol is illustrated in FIG. 3. Whether DRB is configured with header compressed protocol is known from the DRB configuration stored by UE in stored AS context when UE entered the RRC_INATCIVE state.

1. UE is in RRC_CONNECTED (301). In the RRC_CONNECTED, UE receives RRCRelease with suspend configuration (301-1). drb-ContinueROHC (common for all DRBs) may be received in RRCRelease message. gNB Identity mask or gNB Identity may also be received in RRCRelease message.

2. Upon receiving RRCRelease with suspend configuration, UE enters RRC_INACTIVE (302) and performs the following operations:

reset MAC and release the default MAC Cell Group configuration, if any;

re-establish RLC entities for SRB1;

UE store in the UE Inactive AS Context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB received in RRCReconfiguration message while the UE was in RRC_CONNECTED state. The UE also stores next hopping chain count (NCC) and other parameters received in RRCRelease message.

suspend all SRB(s) and DRB(s), except SRB0;

3. During the RRC_INACTIVE, UE initiates RRC connection resumption for small data transmission when criteria (e.g. RSRP is above a threshold and available data volume for transmission is smaller than a threshold and data is available for transmission in RBs for which SDT is allowed and/or connection resumption trigger is received from upper layer i.e. NAS by RRC) to perform small data transmission is met (303). Note that at the time of RRC connection resumption for small data transmission UE can be camped on a cell which is different from cell from which it has received RRCRelease message in step 1.

4. UE re-establishes PDCP entities for SRB(s) and DRB(s) as explained earlier and perform other operations as described in the above section "Operation upon resumption of RRC Connection for small data transmission in RRC_INACTIVE" (304).

5. If drb-ContinueROHC has been received in immediately preceding RRCRelease message (or in RRCRelease message suspending the last RRC connection) (305), and the UE is requesting to resume RRC connection for small data transmission in the cell belonging to GNB identified by GNB identity mask or gNB Identity received in the RRCRelease message (305-1):

continue the header compression protocol context for the DRBs configured with the header compression protocol (306)

else:

reset the header compression protocol context for the DRBs configured with the header compression protocol (306-1)

The cellIdentity is 36 bits. If 'X' Msbs in cellIdentity corresponds to GNB identity, UE can compare the gNB identity of camped cell with gNB identity received in RRCRelease message; if gNB identity mask indicating 'X' Msbs of cell identity is received in RRCRelease message, UE compares this with 'X' Msbs of cellIdentity of camped cell. cellIdentity of camped cell is obtained from SIB1.

In the above operation, RRC message (e.g. RRCReconfiguration message) other than RRCRelease message can also be used. In an embodiment of the above operation, drb-ContinueROHC can be signaled separately for each DRB in RRCRelease/RRC message. In this case, at step 5 the operation will be as follows:

If drb-ContinueROHC has been received in immediately preceding RRCRelease message (or in RRCRelease message suspending the last RRC connection) for a DRB configured with the header compression protocol, and the UE is requesting to resume RRC connection for small data transmission in the cell belonging to GNB identified by GNB identity mask or gNB Identity received in the RRCRelease message: continue the header compression protocol context for that DRB. Otherwise, reset the header compression protocol context for that DRB Method 3B: In yet another method of this disclosure, upon initiation of connection resume for small data transmission, for DRBs which are resumed (as explained earlier), determination of whether to continue or reset the header compression protocol context if DRB is configured with the header compression protocol is illustrated below. Whether DRB is configured with header compressed protocol is known from the DRB configuration stored by UE in stored AS context when UE entered the RRC_INATCIVE state.

1. UE is in RRC_CONNECTED. In the RRC_CONNECTED, UE receives RRCRelease with suspend configuration. gNB Identity mask or gNB Identity is received in RRCRelease message.

2. Upon receiving RRCRelease with suspend configuration, UE enters RRC_INACTIVE and performs the following operations:

reset MAC and release the default MAC Cell Group configuration, if any;

re-establish RLC entities for SRB1;

UE store in the UE Inactive AS Context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB received in RRCReconfiguration message while the UE was in RRC_CONNECTED state. The UE also stores next hopping chain count (NCC) and other parameters received in RRCRelease message.

suspend all SRB(s) and DRB(s), except SRB0;

3. During the RRC_INACTIVE, UE initiates RRC connection resumption for small data transmission when criteria (e.g. RSRP is above a threshold and available data volume for transmission is smaller than a threshold and data is available for transmission in RBs for which SDT is allowed and/or connection resumption trigger is received from upper layer i.e. NAS by RRC) to perform small data transmission is met. Note that at the time of RRC connection resumption for small data transmission UE can be camped on a cell which is different from cell from which it has received RRCRelease message in step 1.

4. UE re-establishes PDCP entities for SRB(s) and DRB(s) as explained earlier and perform other operations as described in the above section "Operation upon resumption of RRC Connection for small data transmission in RRC_INACTIVE".

5. For each DRB being re-established:

In the Inactive AS Context, if DRB is configured with header compression protocol and drb-ContinueROHC is configured in the PDCP configuration of the DRB and If UE is requesting to resume RRC connection for small data transmission in the cell belonging to GNB identified by GNB identity mask or gNB Identity received in the RRCRelease message:

continue the header compression protocol context for that DRB else (In the Inactive AS Context, if DRB is configured with header compression protocol and drb-ContinueROHC is not configured in the PDCP configuration of the DRB):

reset the header compression protocol context for that DRB

The cellIdentity is 36 bits. If 'X' Msbs in cellIdentity corresponds to GNB identity, UE can compare the gNB identity of camped cell with gNB identity received in RRCRelease message; if gNB identity mask indicating 'X' Msbs of cell identity is received in RRCRelease message, UE compares this with 'X' Msbs of cellIdentity of camped cell. cellIdentity of camped cell is obtained from SIB1.

Figure 4:
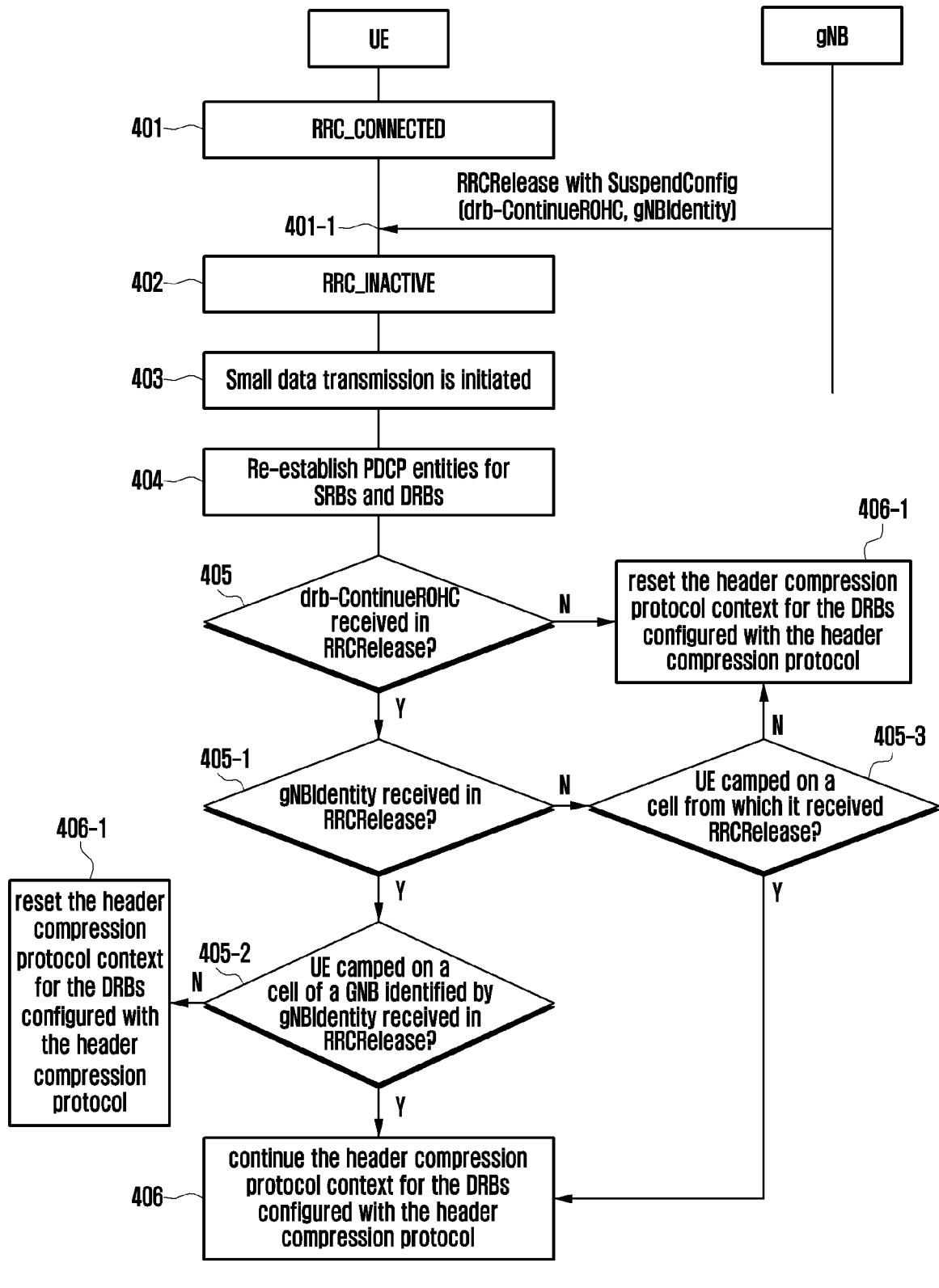
FIG. 4 illustrates another method of the disclosure for determination of whether to continue or reset the header compression protocol context upon initiation of connection resume for small data transmission.

Method 4A: In another method of this disclosure, upon initiation of connection resume for small data transmission, for DRBs which are resumed (as explained earlier), determination of whether to continue or reset the header compression protocol context if DRB is configured with the header compression protocol is illustrated in FIG. 4. Whether DRB is configured with header compressed protocol is known from the DRB configuration stored by UE in stored AS context when UE entered the RRC_INATCIVE state.

1. UE is in RRC_CONNECTED (401). In the RRC_CONNECTED, UE receives RRCRelease with suspend configuration (401-1). drb-ContinueROHC (common for all DRBs) may be received in RRCRelease message. gNB Identity mask or gNB Identity may also be received in RRCRelease message.

2. Upon receiving RRCRelease with suspend configuration, UE enters RRC_INACTIVE (402) and performs the following operations:

reset MAC and release the default MAC Cell Group configuration, if any;

re-establish RLC entities for SRB1;

UE store in the UE Inactive AS Context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB received in RRCReconfiguration message while the UE was in RRC_CONNECTED state. The UE also stores next hopping chain count (NCC) and other parameters received in RRCRelease message.

suspend all SRB(s) and DRB(s), except SRB0;

3. During the RRC_INACTIVE, UE initiates RRC connection resumption for small data transmission when criteria (e.g. RSRP is above a threshold and available data volume for transmission is smaller than a threshold and data is available for transmission in RBs for which SDT is allowed and/or connection resumption trigger is received from upper layer i.e. NAS by RRC) to perform small data transmission is met (403). Note that at the time of RRC connection resumption for small data transmission UE can be camped on a cell which is different from cell from which it has received RRCRelease message in step 1.

4. UE re-establishes PDCP entities for SRB(s) and DRB(s) as explained earlier and perform other operations as described in the above section "Operation upon resumption of RRC Connection for small data transmission in RRC_I-NACTIVE" (404).

5. If drb-ContinueROHC has been received in immediately preceding RRCRelease message (or in RRCRelease message suspending the last RRC connection) (405):

If the UE is requesting to resume RRC connection for small data transmission in the cell belonging to GNB identified by GNB identity mask or gNB Identity (405-2) received in the RRCRelease message (405-1); or If GNB identity mask/gNB Identity is not received in the RRCRelease message and if UE is requesting to resume RRC connection for small data transmission in the same cell (i.e. cell from which it has received RRCRelease message) (405-3):

continue the header compression protocol context for the DRBs configured with the header compression protocol (406)

else:

reset the header compression protocol context for the DRBs configured with the header compression protocol (406-1)

The cellIdentity is 36 bits. If 'X' Msbs in cellIdentity corresponds to GNB identity, UE can compare the gNB identity of camped cell with gNB identity received in RRCRelease message; if gNB identity mask indicating 'X' Msbs of cell identity is received in RRCRelease message, UE compares this with 'X' Msbs of cellIdentity of camped cell. cellIdentity of camped cell is obtained from SIB1.

6. else (If drb-ContinueROHC has not been received in immediately preceding RRCRelease message (or in RRCRelease message suspending the last RRC connection):

reset the header compression protocol context for the DRBs configured with the header compression protocol (406-1)

In the above operation, RRC message (e.g. RRCReconfiguration message) other than RRCRelease message can also be used. In an embodiment of the above operation, drb-ContinueROHC can be signaled separately for each DRB in RRCRelease/RRC message. In this case, at step 5/6 the operation will be as follows:

If drb-ContinueROHC has been received in immediately preceding RRCRelease message (or in RRCRelease message suspending the last RRC connection) for a DRB configured with the header compression protocol:

If the UE is requesting to resume RRC connection for small data transmission in the cell belonging to GNB identified by GNB identity mask or gNB Identity received in the RRCRelease message; or If GNB identity mask/gNB Identity is not received in the RRCRelease message and if UE is requesting to resume RRC connection for small data transmission in the same cell (i.e. cell from which it has received RRCRelease message):

continue the header compression protocol context for that DRB else:

reset the header compression protocol context for that DRB else (If drb-ContinueROHC has not been received in immediately preceding RRCRelease message (or in RRCRelease message suspending the last RRC connection):

reset the header compression protocol context for that DRB

Method 4B: In one method of this disclosure, upon initiation of connection resume for small data transmission, for DRBs which are resumed (as explained earlier), determination of whether to continue or reset the header compression protocol context if DRB is configured with the header compression protocol is illustrated below. Whether DRB is configured with header compressed protocol is known from the DRB configuration stored by UE in stored AS context when UE entered the RRC_INATCIVE state.

1. UE is in RRC_CONNECTED. In the RRC_CONNECTED, UE receives RRCRelease with suspend configuration. gNB Identity mask or gNB Identity is received in RRCRelease message.

2. Upon receiving RRCRelease with suspend configuration, UE enters RRC_INACTIVE and performs the following operations:

reset MAC and release the default MAC Cell Group configuration, if any;

re-establish RLC entities for SRB1;

UE store in the UE Inactive AS Context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB received in RRCReconfiguration message while the UE was in RRC_CONNECTED state. The UE also stores next hopping chain count (NCC) and other parameters received in RRCRelease message.

suspend all SRB(s) and DRB(s), except SRB0;

3. During the RRC_INACTIVE, UE initiates RRC connection resumption for small data transmission when criteria (e.g. RSRP is above a threshold and available data volume for transmission is smaller than a threshold and data is available for transmission in RBs for which SDT is allowed and/or connection resumption trigger is received from upper layer i.e. NAS by RRC) to perform small data transmission is met. Note that at the time of RRC connection resumption for small data transmission UE can be camped on a cell which is different from cell from which it has received RRCRelease message in step 1.

4. UE re-establishes PDCP entities for SRB(s) and DRB(s) as explained earlier and perform other operations as described in the above section "Operation upon resumption of RRC Connection for small data transmission in RRC_I-NACTIVE".

5. For each DRB being re-established:

In the Inactive AS Context, if DRB is configured with header compression protocol and drb-ContinueROHC is configured in the PDCP configuration of the DRB:

If the UE is requesting to resume RRC connection for small data transmission in the cell belonging to GNB identified by GNB identity mask or gNB Identity received in the RRCRelease message; or If cell list is not received in the RRCRelease message and if UE is requesting to resume RRC connection for small data transmission in the same cell (i.e. cell from which it has received RRCRelease message):

continue the header compression protocol context for that DRB else:

reset the header compression protocol context for that DRB else (In the Inactive AS Context, if DRB is configured with header compression protocol and drb-ContinueROHC is not configured in the PDCP configuration of the DRB):

reset the header compression protocol context for that DRB

Figure 5:
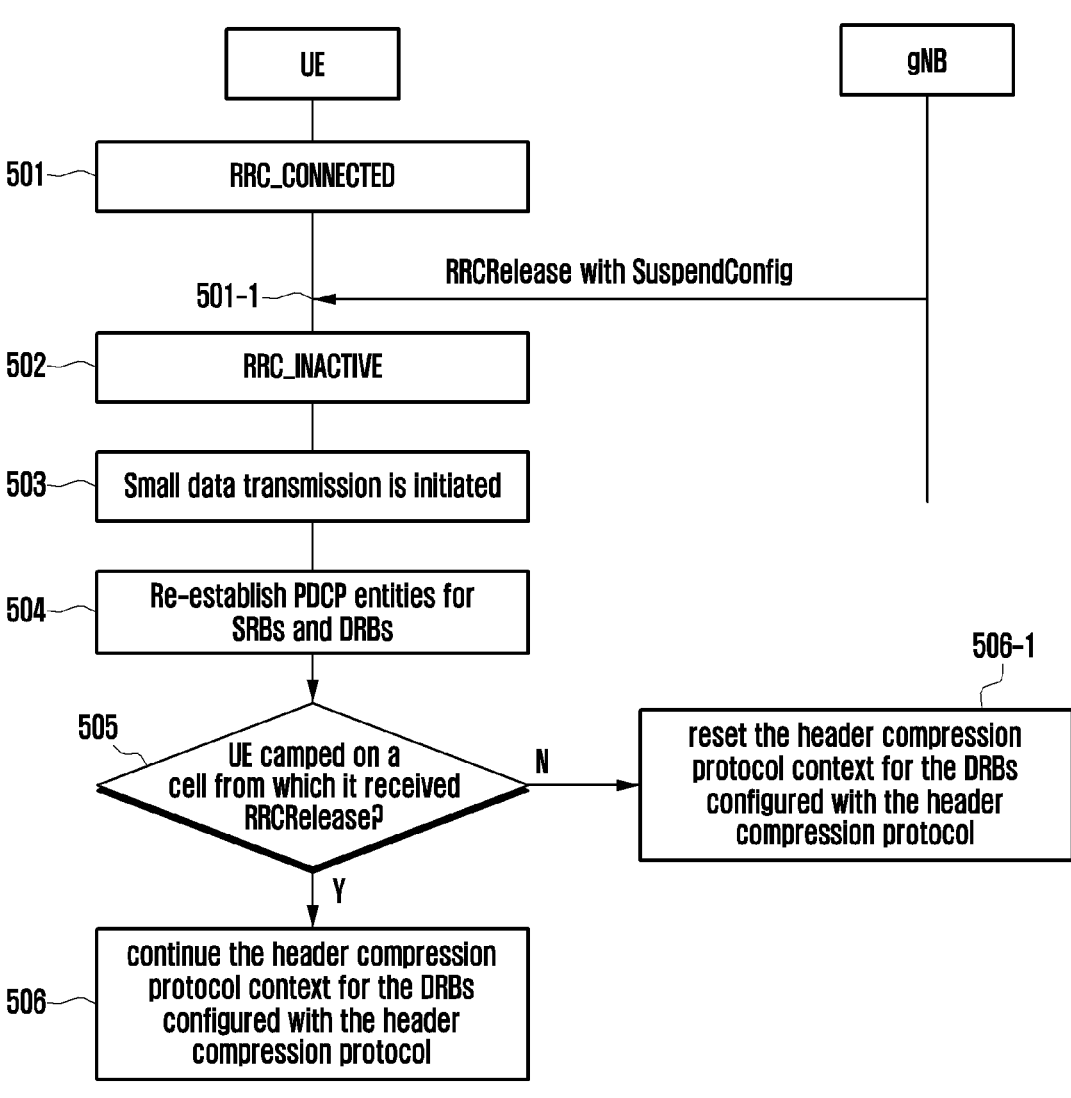
FIG. 5 illustrates another method of the disclosure for determination of whether to continue or reset the header compression protocol context upon initiation of connection resume for small data transmission.

Method 5: In one method of this disclosure, upon initiation of connection resume for small data transmission, for DRBs which are resumed (DRBs to be resumed is explained earlier), determination of whether to continue or reset the header compression protocol context if DRB is configured with the header compression protocol is illustrated in FIG. 5. Whether DRB is configured with header compressed protocol is known from the DRB configuration stored by UE in stored AS context when UE entered the RRC_INATCIVE state.

1. UE is in RRC_CONNECTED (501). In the RRC_CONNECTED, UE receives RRCRelease with suspend configuration (501-1).

2. Upon receiving RRCRelease with suspend configuration, UE enters RRC_INACTIVE (502) and performs the following operations:

reset MAC and release the default MAC Cell Group configuration, if any;

re-establish RLC entities for SRB1;

UE store in the UE Inactive AS Context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB received in RRCReconfiguration message while the UE was in RRC_CONNECTED state. The UE also stores next hopping chain count (NCC) and other parameters received in RRCRelease message.

suspend all SRB(s) and DRB(s), except SRB0;

3. During the RRC_INACTIVE, UE initiates RRC connection resumption for small data transmission when criteria (e.g. RSRP is above a threshold and available data volume for transmission is smaller than a threshold and data is available for transmission in RBs for which SDT is allowed and/or connection resumption trigger is received from upper layer i.e. NAS by RRC) to perform small data transmission is met (503). Note that at the time of RRC connection resumption for small data transmission UE can be camped on a cell which is different from cell from which it has received RRCRelease message in step 1.

4. UE re-establishes PDCP entities for SRB(s) and DRB(s) as explained earlier and perform other operations as described in the above section "Operation upon resumption of RRC Connection for small data transmission in RRC_I-NACTIVE" (504).

5. If the UE is requesting to resume RRC connection for small data transmission in same cell from which it received RRCRelease message (or cell from which it has received RRCRelease message suspending the last RRC connection or cell from which the last RRCRelease message is received) (505):

continue the header compression protocol context for the DRBs configured with the header compression protocol (506)

else:

reset the header compression protocol context for the DRBs configured with the header compression protocol (506-1)

5-1. (Alternate for step 5) If the UE is requesting to resume RRC connection for small data transmission in cell which belongs to same RAN notification area as the cell from which it received RRCRelease message (or cell from which it has received RRCRelease message suspending the last RRC connection or cell from which the last RRCRelease message is received):

continue the header compression protocol context for the DRBs configured with the header compression protocol else:

reset the header compression protocol context for the DRBs configured with the header compression protocol (i.e. DRBs configured with the header compression protocol in the Inactive AS Context)

5-2. (Alternate for step 5) For each DRB being re-established:

In the Inactive AS Context, if DRB is configured with header compression protocol and drb-ContinueROHC is configured in the PDCP configuration of the DRB and if the UE is requesting to resume RRC connection for small data transmission in cell which belongs to same RAN notification area as the cell from which it received RRCRelease message (or cell from which it has received RRCRelease message suspending the last RRC connection or cell from which the last RRCRelease message is received):

continue the header compression protocol context for that DRB else:

reset the header compression protocol context for that DRB if configured with the header compression protocol 5-3. (Alternate for step 5) For each DRB being re-established:

In the Inactive AS Context, if DRB is configured with header compression protocol and drb-ContinueROHC is configured in the PDCP configuration of the DRB and if the UE is requesting to resume RRC connection for small data transmission in same cell as the cell from which it received RRCRelease message (or cell from which it has received RRCRelease message suspending the last RRC connection or cell from which the last RRCRelease message is received):

continue the header compression protocol context for that DRB else:

reset the header compression protocol context for that DRB if configured with the header compression protocol (i.e. DRBs configured with the header compression protocol in the Inactive AS Context)

Figure 6:
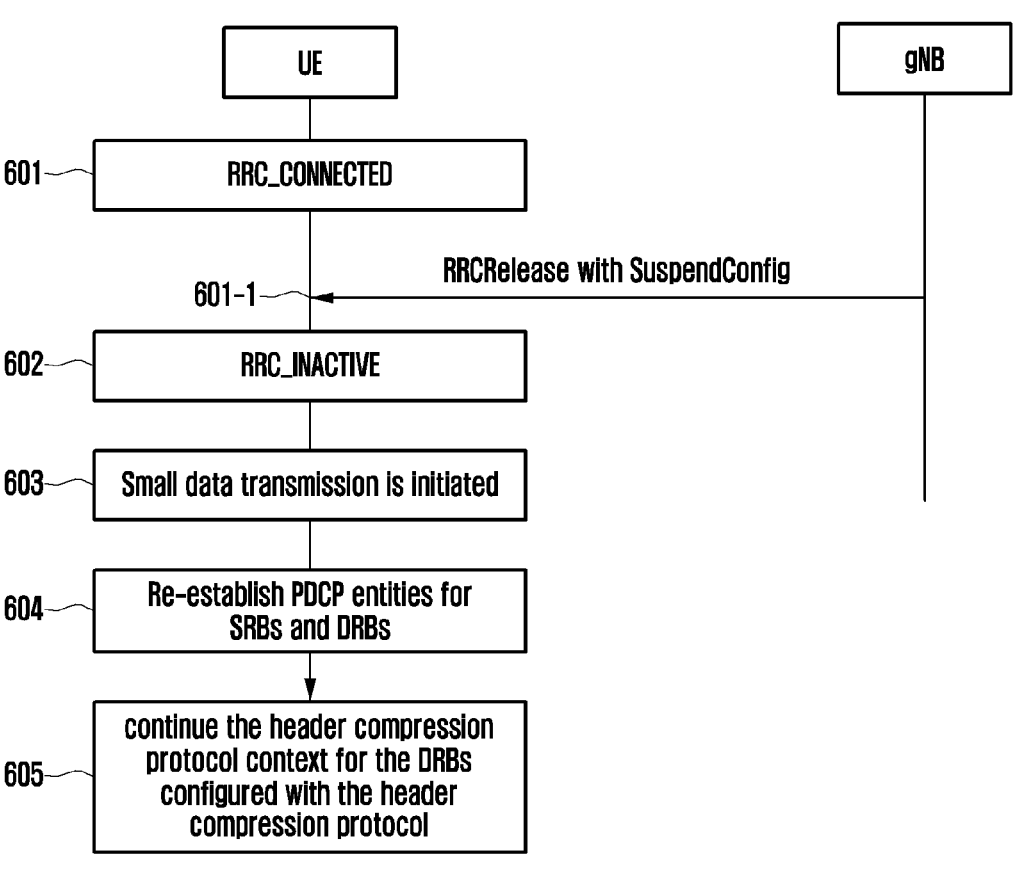
FIG. 6 illustrates another method of the disclosure for determination of whether to continue or reset the header compression protocol context upon initiation of connection resume for small data transmission.

Method 6: In one method of this disclosure, upon initiation of connection resume for small data transmission, for DRBs which are resumed (DRBs to be resumed is explained earlier), determination of whether to continue or reset the header compression protocol context if DRB is configured with the header compression protocol is illustrated in FIG. 6. Whether DRB is configured with header compressed protocol is known from the DRB configuration stored by UE in stored AS context when UE entered the RRC_INATCIVE state.

1. UE is in RRC_CONNECTED (601). In the RRC_CONNECTED, UE receives RRCRelease with suspend configuration (601-1).

2. Upon receiving RRCRelease with suspend configuration, UE enters RRC_INACTIVE (602) and performs the following operations:

reset MAC and release the default MAC Cell Group configuration, if any;

re-establish RLC entities for SRB1;

UE store in the UE Inactive AS Context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB received in RRCReconfiguration message while the UE was in RRC_CONNECTED state. The UE also stores next hopping chain count (NCC) and other parameters received in RRCRelease message.

suspend all SRB(s) and DRB(s), except SRB0;

3. During the RRC_INACTIVE, UE initiates RRC connection resumption for small data transmission when criteria (e.g. RSRP is above a threshold and available data volume for transmission is smaller than a threshold and data is available for transmission in RBs for which SDT is allowed and/or connection resumption trigger is received from upper layer i.e. NAS by RRC) to perform small data transmission is met (603). Note that at the time of RRC connection resumption for small data transmission UE can be camped on a cell which is different from cell from which it has received RRCRelease message in step 1.

4. UE re-establishes PDCP entities for SRB(s) and DRB(s) as explained earlier and perform other operations as described in the above section "Operation upon resumption of RRC Connection for small data transmission in RRC_INACTIVE" (604).

5.UE continue the header compression protocol context for the DRBs configured with the header compression protocol (605). (i.e. DRBs configured with the header compression protocol in the Inactive AS Context).

Figure 7:
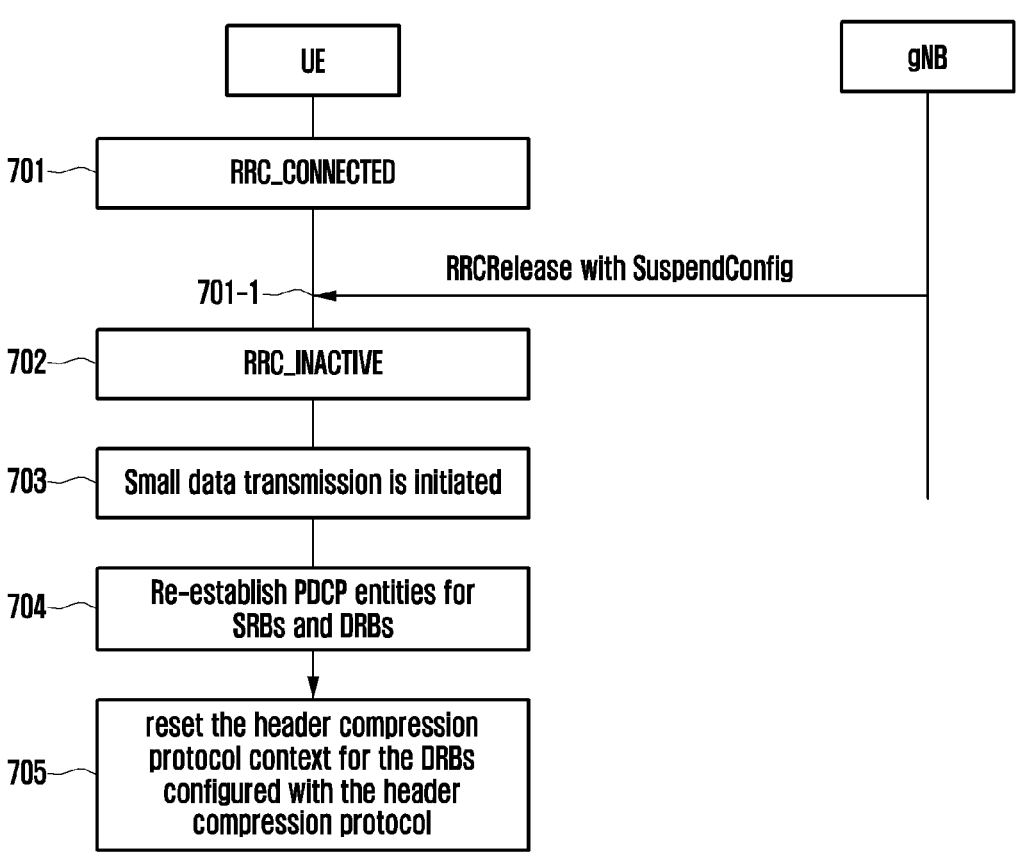
FIG. 7 illustrates another method of the disclosure for determination of whether to continue or reset the header compression protocol context upon initiation of connection resume for small data transmission.

Method 7: In one method of this disclosure, upon initiation of connection resume for small data transmission, for DRBs which are resumed (DRBs to be resumed is explained earlier), determination of whether to continue or reset the header compression protocol context if DRB is configured with the header compression protocol is illustrated in FIG. 7. Whether DRB is configured with header compressed protocol is known from the DRB configuration stored by UE in stored AS context when UE entered the RRC_INATCIVE state.

1. UE is in RRC_CONNECTED (701). In the RRC_CONNECTED, UE receives RRCRelease with suspend configuration (701-1).

2. Upon receiving RRCRelease with suspend configuration, UE enters RRC_INACTIVE (702) and performs the following operations:

reset MAC and release the default MAC Cell Group configuration, if any;

re-establish RLC entities for SRB1;

UE store in the UE Inactive AS Context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB received in RRCReconfiguration message while the UE was in RRC_CONNECTED state. The UE also stores next hopping chain count (NCC) and other parameters received in RRCRelease message.

suspend all SRB(s) and DRB(s), except SRB0;

3. During the RRC_INACTIVE, UE initiates RRC connection resumption for small data transmission when criteria (e.g. RSRP is above a threshold and available data volume for transmission is smaller than a threshold and data is available for transmission in RBs for which SDT is allowed and/or connection resumption trigger is received from upper layer i.e. NAS by RRC) to perform small data transmission is met (703). Note that at the time of RRC connection resumption for small data transmission UE can be camped on a cell which is different from cell from which it has received RRCRelease message in step 1.

4. UE re-establishes PDCP entities for SRB(s) and DRB(s) as explained earlier and perform other operations as described in the above section "Operation upon resumption of RRC Connection for small data transmission in RRC_INACTIVE" (704).

5. UE reset the header compression protocol context for the DRBs configured with the header compression protocol (705). (i.e. DRBs configured with the header compression protocol in the Inactive AS Context).

Figure 8:
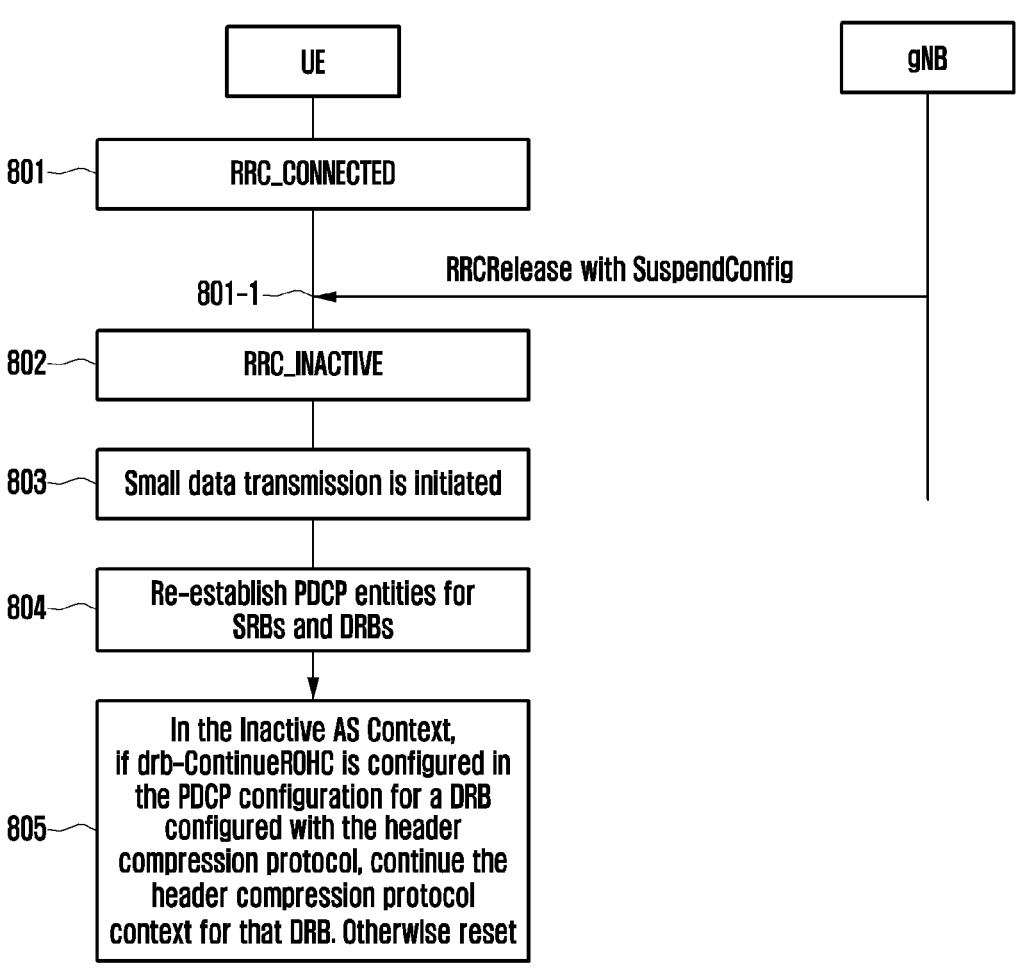
FIG. 8 illustrates another method of the disclosure for determination of whether to continue or reset the header compression protocol context upon initiation of connection resume for small data transmission.

Method 8: In one method of this disclosure, upon initiation of connection resume for small data transmission, for DRBs which are resumed (DRBs to be resumed is explained earlier), determination of whether to continue or reset the header compression protocol context if DRB is configured with the header compression protocol is illustrated in FIG. 8. Whether DRB is configured with header compressed protocol is known from the DRB configuration stored by UE in stored AS context when UE entered the RRC_INATCIVE state.

1. UE is in RRC_CONNECTED (801). In the RRC_CONNECTED, UE receives RRCRelease with suspend configuration (801-1).

2. Upon receiving RRCRelease with suspend configuration, UE enters RRC_INACTIVE (802) and performs the following operations:

reset MAC and release the default MAC Cell Group configuration, if any;

re-establish RLC entities for SRB1;

UE store in the UE Inactive AS Context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB received in RRCReconfiguration message while the UE was in RRC_CONNECTED state. The UE also stores next hopping chain count (NCC) and other parameters received in RRCRelease message.

suspend all SRB(s) and DRB(s), except SRB0;

3. During the RRC_INACTIVE, UE initiates RRC connection resumption for small data transmission when criteria (e.g. RSRP is above a threshold and available data volume for transmission is smaller than a threshold and data is available for transmission in RBs for which SDT is allowed and/or connection resumption trigger is received from upper layer i.e. NAS by RRC) to perform small data transmission is met (803). Note that at the time of RRC connection resumption for small data transmission UE can be camped on a cell which is different from cell from which it has received RRCRelease message in step 1.

4. UE re-establishes PDCP entities for SRB(s) and DRB(s) as explained earlier and perform other operations as described in the above section "Operation upon resumption of RRC Connection for small data transmission in RRC INACTIVE" (804).

5. In the Inactive AS Context, if DRB is configured with header compression protocol and drb-ContinueROHC is configured in the PDCP configuration of the DRB:

continue the header compression protocol context for that DRB (805)

6. else:

reset the header compression protocol context for that DRB if DRB is configured with header compression protocol Method 9: In one method of this disclosure, upon initiation of connection resume for small data transmission, for DRBs which are resumed (as explained earlier), determination of whether to continue or reset the header compression protocol context if DRB is configured with the header compression protocol is illustrated below. Whether DRB is configured with header compressed protocol is known from the DRB configuration stored by UE in stored AS context when UE entered the RRC_INATCIVE state.

1. UE is in RRC_CONNECTED. In the RRC_CONNECTED, UE receives RRCRelease with suspend configuration. drb-ContinueROHC (common for all DRBs) may be received in RRCRelease message. gNB Identity mask or gNB Identity or cell list or RAN area list may be received in RRCRelease message.

2. Upon receiving RRCRelease with suspend configuration, UE enters RRC_INACTIVE and performs the following operations:

reset MAC and release the default MAC Cell Group configuration, if any;

re-establish RLC entities for SRB1;

UE store in the UE Inactive AS Context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB received in RRCReconfiguration message while the UE was in RRC_CONNECTED state. The UE also stores next hopping chain count (NCC) and other parameters received in RRCRelease message.

suspend all SRB(s) and DRB(s), except SRB0;

3. During the RRC_INACTIVE, UE initiates RRC connection resumption for small data transmission when criteria (e.g. RSRP is above a threshold and available data volume for transmission is smaller than a threshold and data is available for transmission in RBs for which SDT is allowed and/or connection resumption trigger is received from upper layer i.e. NAS by RRC) to perform small data transmission is met. Note that at the time of RRC connection resumption for small data transmission UE can be camped on a cell which is different from cell from which it has received RRCRelease message in step 1.

4. UE re-establishes PDCP entities for SRB(s) and DRB(s) as explained earlier and perform other operations as described in the above section "Operation upon resumption of RRC Connection for small data transmission in RRC_INACTIVE".

5. If drb-ContinueROHC has been received in immediately preceding RRCRelease message (or in RRCRelease message suspending the last RRC connection):

If gNB identity mask or gNB identity received in the RRCRelease message and If the UE is requesting to resume RRC connection for small data transmission in the cell belonging to GNB identified by GNB identity mask or gNB Identity received in the RRCRelease message; or If cell list is received in the RRCRelease message and If the UE is requesting to resume RRC connection for small data transmission in the cell which belongs to cell list received in the RRCRelease message; or If RAN area list is received in the RRCRelease message and If the UE is requesting to resume RRC connection for small data transmission in the cell of RAN area which belongs to RAN area list received in the RRCRelease message; or If GNB identity mask/gNB Identity/cell list/RAN area list is not received in the RRCRelease message and if UE is requesting to resume RRC connection for small data transmission in the same cell (i.e. cell from which it has received RRCRelease message):

continue the header compression protocol context for the DRBs configured with the header compression protocol else:

reset the header compression protocol context for the DRBs configured with the header compression protocol.

The cellIdentity is 36 bits. If 'X' Msbs in cellIdentity corresponds to GNB identity, UE can compare the gNB identity of camped cell with gNB identity received in RRCRelease message; if gNB identity mask indicating 'X' Msbs of cell identity is received in RRCRelease message, UE compares this with 'X' Msbs of cellIdentity of camped cell. cellIdentity of camped cell is obtained from SIB1.

6. else (If drb-ContinueROHC has not been received in immediately preceding RRCRelease message (or in RRCRelease message suspending the last RRC connection):

reset the header compression protocol context for the DRBs configured with the header compression protocol In the above operation, RRC message (e.g. RRCReconfiguration message) other than RRCRelease message can also be used. In an embodiment of the above operation, drb-ContinueROHC can be signaled separately for each DRB in RRCRelease/RRC message. In this case, at step 5/6 the operation will be as follows:

If drb-ContinueROHC has been received in immediately preceding RRCRelease message (or in RRCRelease message suspending the last RRC connection) for a DRB configured with the header compression protocol:

If gNB identity mask or gNB identity received in the RRCRelease message and If the UE is requesting to resume RRC connection for small data transmission in the cell belonging to GNB identified by GNB identity mask or gNB Identity received in the RRCRelease message; or If cell list is received in the RRCRelease message and If the UE is requesting to resume RRC connection for small data transmission in the cell which belongs to cell list received in the RRCRelease message; or If RAN area list is received in the RRCRelease message and If the UE is requesting to resume RRC connection for small data transmission in the cell of RAN area which belongs to RAN area list received in the RRCRelease message; or If GNB identity mask/gNB Identity/cell list/RAN area list is not received in the RRCRelease message and if UE is requesting to resume RRC connection for small data transmission in the same cell (i.e. cell from which it has received RRCRelease message):

continue the header compression protocol context for that DRB else:

reset the header compression protocol context for that DRB else (If drb-ContinueROHC has not been received in immediately preceding RRCRelease message (or in RRCRelease message suspending the last RRC connection):

reset the header compression protocol context for that DRB.

<<Handling PHR for Small Data Transmission in RRC_I-NACTIVE>>

Figure 9:
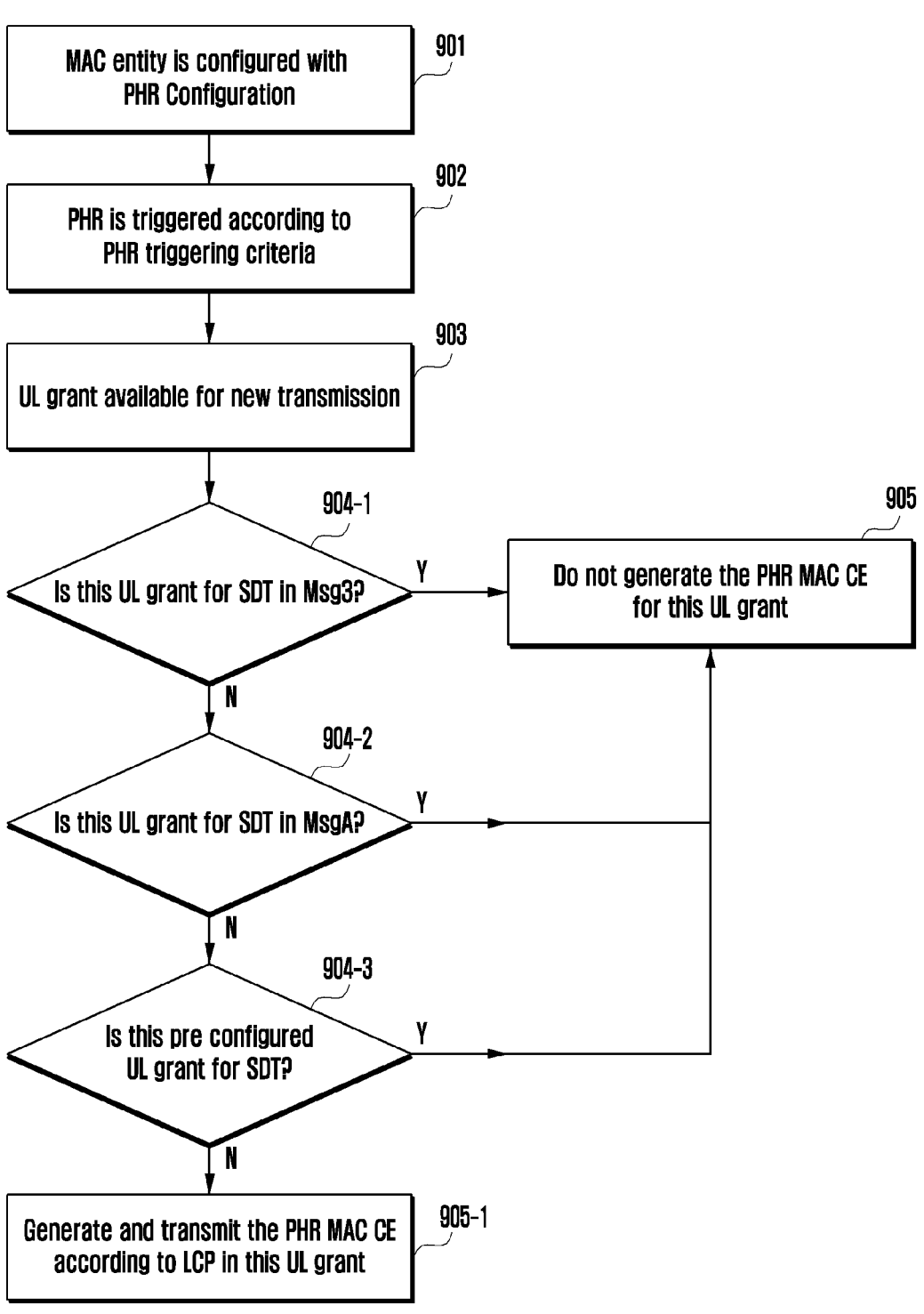
FIG. 9 illustrates one method of the disclosure for handling PHR for small data transmission in RRC_INACTIVE state.
Figure 10:
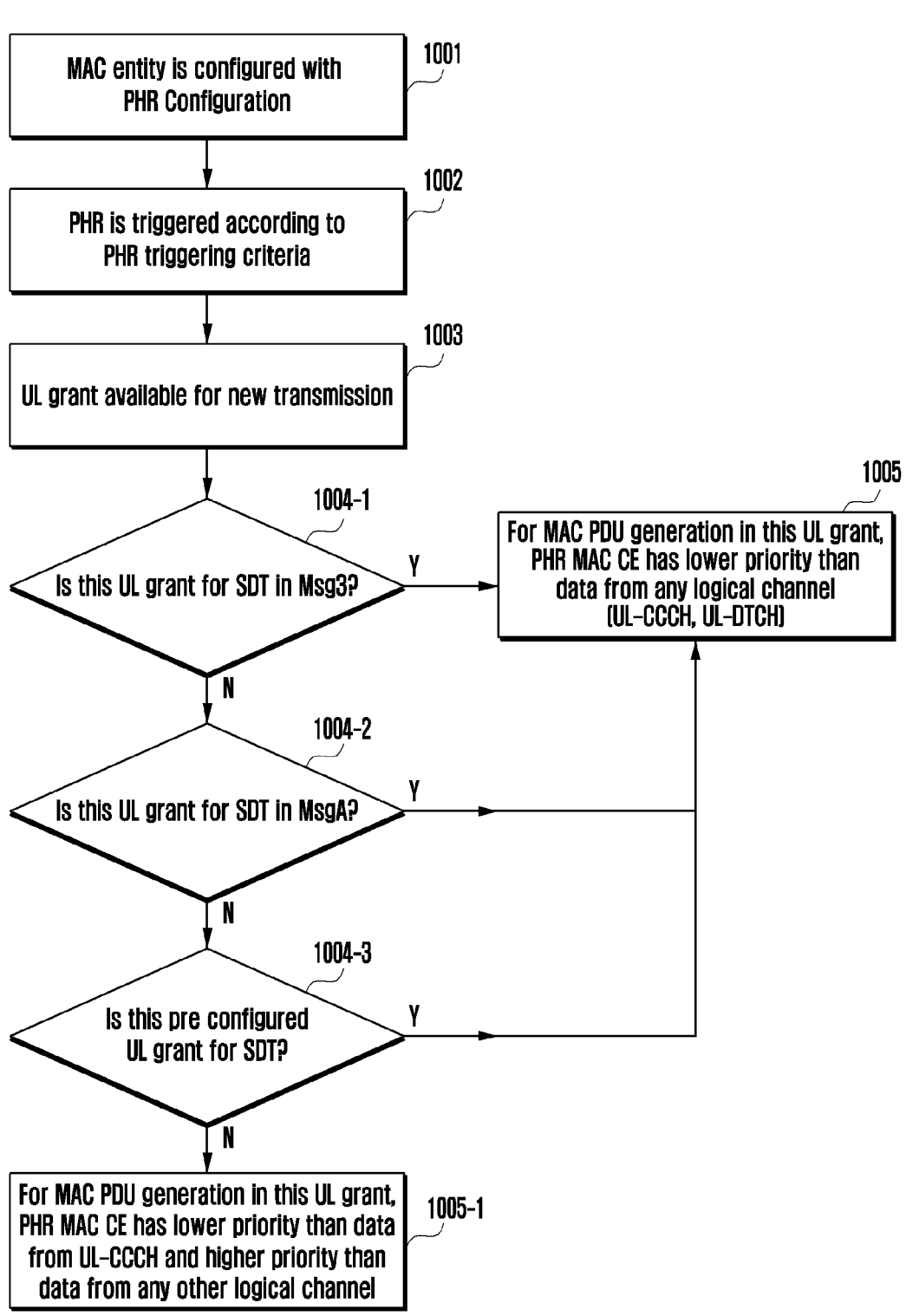
FIG. 10 illustrates another method of the disclosure for handling PHR for small data transmission in RRC_INACTIVE state.

FIGS. 9 and 10 illustrate various methods for handling PHR for small data transmission in RRC_INACTIVE state. Various methods of the present disclosure will be described in detail with reference to the figures. The following methods are illustrative for various embodiments of the disclosure, and may be modified or combined with each other by those skilled in the art.

Method 1:

UE is in RRC_INACTIVE

During the RRC_INACTIVE, UE initiates RRC connection resumption for small data transmission when criteria to perform SDT is met For small data transmission using 4 step random access (RA) procedure, MAC entity generates MAC PDU for Msg3 transmission For small data transmission using 2 step RA procedure, MAC entity generates MAC PDU for MsgA transmission For small data transmission using preconfigured UL resources, MAC entity generates MAC PDU for transmission in preconfigured UL grant For small data transmission, the MAC entity shall not generate a PHR MAC control element (if there is an triggered PHR) if new transmission is for Msg3/MsgA/ Preconfigured UL grant In one method of this disclosure UE operation for handling PHR is illustrated in FIG. 9.

MAC entity in UE is configured with PHR configuration (901). The PHR configuration can be default PHR configuration or the one received from network. PHR triggering criteria is met (902). Subsequent to PHR triggering, UL grant is available for transmission which can be a dynamic grant or pre-configured UL grant (903). UE determines whether the UL grant is for SDT in Msg3 (904-1) or whether the UL grant is for SDT in MsgA (904-2) or whether the UL grant is a pre-configured UL grant for SDT (904-3). If the UL grant is for SDT in MsgA/Msg3/pre-configured resource or first UL transmission in pre-configured resource, UE does not generate PHR MAC CE for this UL grant (905). Otherwise, UE generate and transmit the PHR MAC CE according to LCP (logical channel prioritization) procedure in this UL grant (905-1). The advantage of this operation is that data and control message needed for small data transmission procedure are prioritised over PHR. PHR cannot be transmitted along with small data and can be transmitted later.

PHR triggering criteria for this operation can be given as follows:

A Power Headroom Report (PHR) shall be triggered if any of the following events occur:

phr-ProhibitTimer expires or has expired and the path loss has changed more than phr-Tx-PowerFactorChange dB for at least one activated Serving Cell of any MAC entity which is used as a pathloss reference since the last transmission of a PHR in this MAC entity when the MAC entity has UL resources for new transmission;

phr-PeriodicTimer expires;

upon configuration or reconfiguration of the power headroom reporting functionality by upper layers, which is not used to disable the function;

activation of an SCell of any MAC entity with configured uplink;

addition of the PSCell (i.e. PSCell is newly added or changed);

Method 2:

In another method of this disclosure UE operation for handling PHR is illustrated in FIG. 10.

MAC entity in UE is configured with PHR configuration (1001). The PHR configuration can be default PHR configuration or the one received from network. PHR triggering criteria is met (1002). Subsequent to PHR triggering, UL grant is available for transmission which can be a dynamic grant or pre-configured UL grant (1003). UE determines whether the UL grant is for SDT in Msg3 (1004-1) or whether the UL grant is for SDT in MsgA (1004-2) or whether the UL grant is a pre-configured UL grant for SDT (1004-3). If the UL grant is for SDT in MsgA/Msg3/preconfigured resource or first UL transmission in pre-configured resource, for MAC PDU generation in this UL grant, PHR MAC CE has lower priority than data from any logical channel (UL-CCCH, UL-DTCH) (1005). Otherwise, for MAC PDU generation in this UL grant, PHR MAC CE has lower priority than data from UL-CCCH and higher priority than data from any other logical channel (1005-1). The advantage of this operation is that data and control message needed for small data transmission procedure are prioritised over PHR. PHR can still be transmitted if UL grant is large enough to accommodate control message, UL data and PHR.

In an embodiment, wherein MAC PDU size is used to determine whether to perform SDT or not, The MAC PDU size does not include PHR when determining whether to trigger SDT or not. The triggered PHR is cancelled if the uplink transmission is SDT or the PHR is not triggered if SDT is ongoing.

Handling BSR for Small Data Transmission in
RRC_INACTIVE

Figure 11:
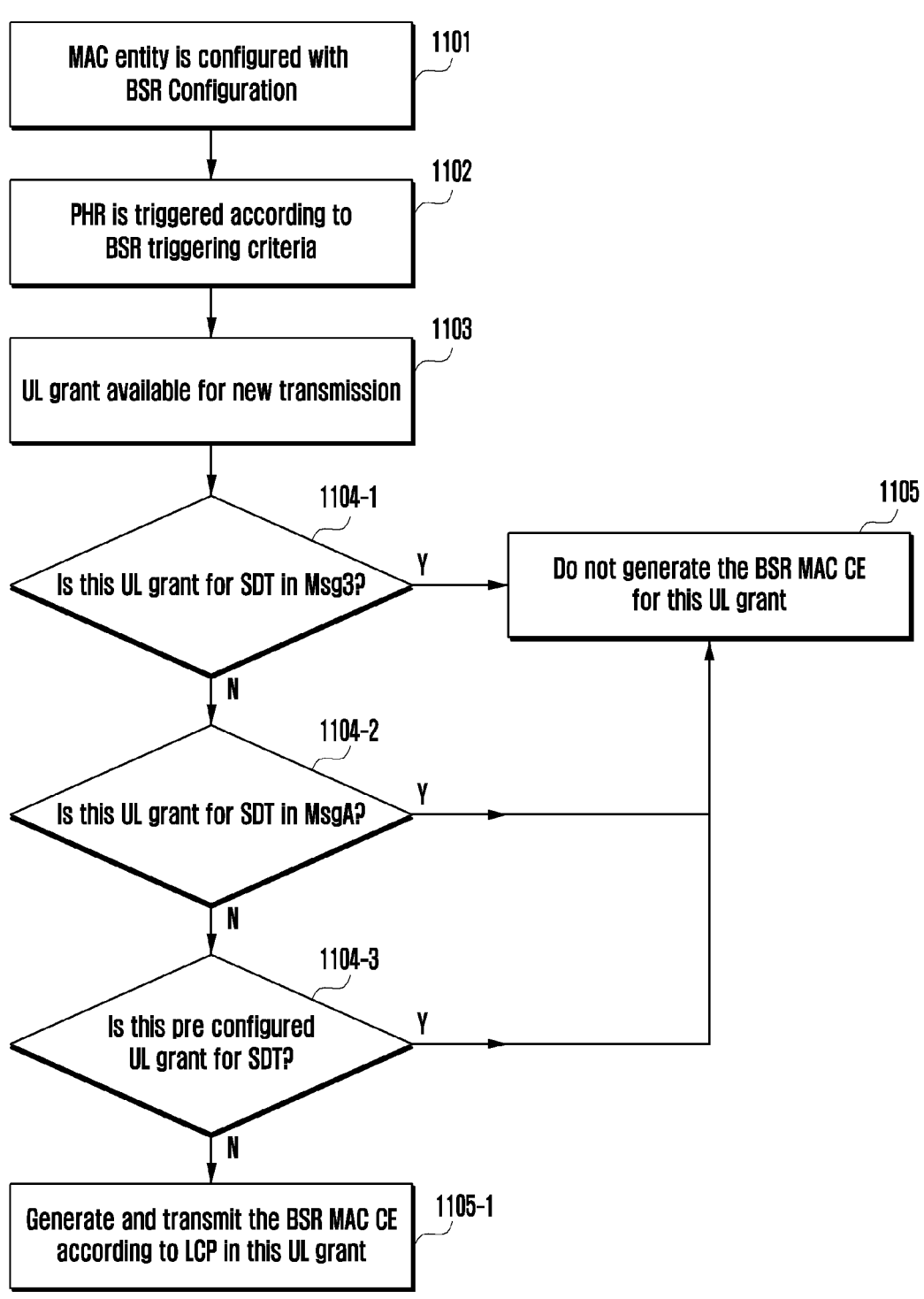
FIG. 11 illustrates one method of the disclosure for handling BSR for small data transmission in RRC_INACTIVE state.
Figure 12:
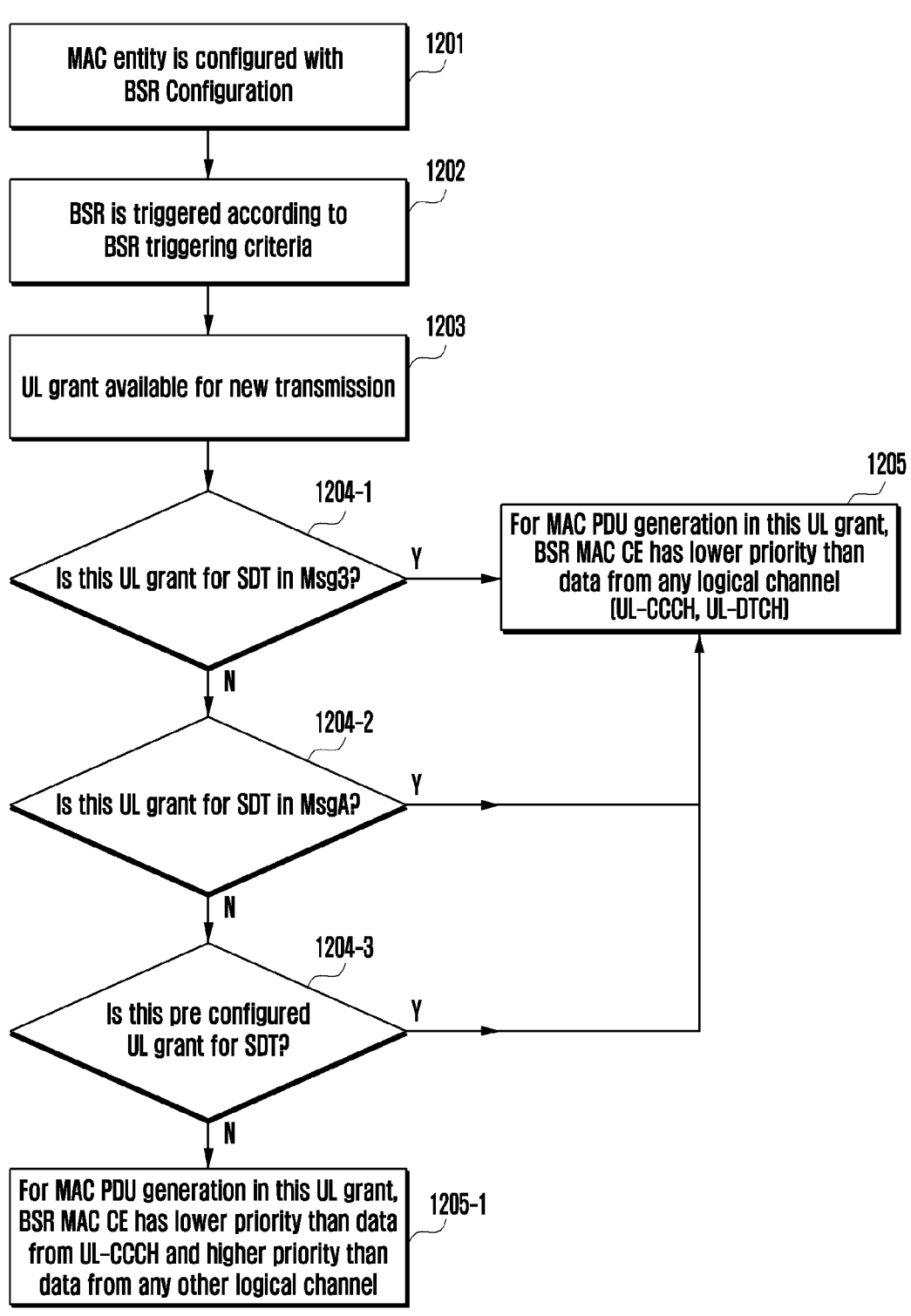
FIG. 12 illustrate another method of the disclosure for handling BSR for small data transmission in RRC_INACTIVE state.

FIGS. 11 and 12 illustrate various methods for handling buffer status report (BSR) for small data transmission in RRC_INACTIVE state. Various methods of the present disclosure will be described in detail with reference to the figures. The following methods are illustrative for various embodiments of the disclosure, and may be modified or combined with each other by those skilled in the art.

Method 1

UE is in RRC_INACTIVE

During the RRC_INACTIVE, UE initiates RRC connection resumption_for small data transmission when criteria to perform SDT is met For small data transmission using 4 step random access (RA) procedure, MAC entity generates MAC PDU for Msg3 transmission For small data transmission using 2 step RA procedure, MAC entity generates MAC PDU for MsgA transmission For small data transmission using preconfigured UL resources, MAC entity generates MAC PDU for transmission in preconfigured UL grant For small data transmission, the MAC entity shall not generate a BSR MAC control element (if there is any triggered BSR) if new transmission is for Msg3/MsgA/Preconfigured UL grant In one method of this disclosure UE operation for handling BSR is illustrated in FIG. 11.

MAC entity in UE is configured with BSR configuration (1101). The BSR configuration can be default BSR configuration or the one received from network. BSR triggering criteria is met (1102). Subsequent to BSR triggering, UL grant is available for transmission which can be a dynamic grant or pre-configured UL grant (1103). UE determines whether the UL grant is for SDT in Msg3 (1104-1) or whether the UL grant is for SDT in MsgA (1104-2) or whether the UL grant is a pre-configured UL grant for SDT (1104-3) or whether the UL grant is a pre-configured UL grant for first UL (PUSCH) transmission during SDT procedure. If the UL grant is for SDT in MsgA/Msg3/preconfigured resource or first UL transmission in pre-configured resource, UE does not generate BSR MAC CE for this UL grant (1105). Otherwise, UE generate and transmit the BSR MAC CE according to LCP procedure in this UL grant (1105-1). The advantage of this operation is that data and control message needed for small data transmission procedure are prioritized over BSR. BSR cannot be transmitted along with small data and can be transmitted later.

BSR triggering criteria for this operation can be given as follows:

UL data, for a logical channel which belongs to a logical channel group (LCG), becomes available to the MAC entity; and either this UL data belongs to a logical channel with higher priority than the priority of any logical channel containing available UL data which belong to any LCG; or none of the logical channels which belong to an LCG contains any available UL data.

in which case the BSR is referred below to as 'Regular BSR';

UL resources are allocated and number of padding bits is equal to or larger than the size of the Buffer Status Report MAC CE plus its subheader, in which case the BSR is referred below to as 'Padding BSR';

retxBSR-Timer expires, and at least one of the logical channels which belong to an LCG contains UL data, in which case the BSR is referred below to as 'Regular BSR';

periodicBSR-Timer expires, in which case the BSR is referred below to as 'Periodic BSR'.

Method 2

In another method of this disclosure UE operation for handling BSR is illustrated in FIG. 12.

MAC entity in UE is configured with BSR configuration (1201). The BSR configuration can be default BSR configuration or the one received from network. BSR triggering criteria is met (1202). Subsequent to BSR triggering, UL grant is available for transmission which can be a dynamic grant or pre-configured UL grant (1203). UE determines whether the UL grant is for SDT in Msg3 (1204-1) or whether the UL grant is for SDT in MsgA (1204-2) or whether the UL grant is a pre-configured UL grant for SDT (1204-3) or whether the UL grant is a pre-configured UL grant for first UL (PUSCH) transmission during SDT procedure. If the UL grant is for SDT in MsgA/Msg3/preconfigured resource or first UL transmission in pre-configured resource, for MAC PDU generation in this UL grant, BSR MAC CE has lower priority than data from any logical channel (UL-CCCH, UL-DTCH) (1205). Otherwise, For MAC PDU generation in this UL grant, BSR MAC CE has lower priority than data from UL-CCCH and higher priority than data from any other logical channel (1205-1). The advantage of this operation is that data and control message needed for small data transmission procedure are prioritized over BSR. BSR can still be transmitted if UL grant is large enough to accommodate control message, UL data and BSR. Here BSR is the BSR other than padding BSR.

In an embodiment, wherein MAC PDU size is used to determine whether to perform SDT or not, The MAC PDU size does not include BSR when determining whether to trigger SDT or not. The triggered BSR is cancelled if the uplink transmission is SDT or the BSR is not triggered if SDT is ongoing.

Figure 13:
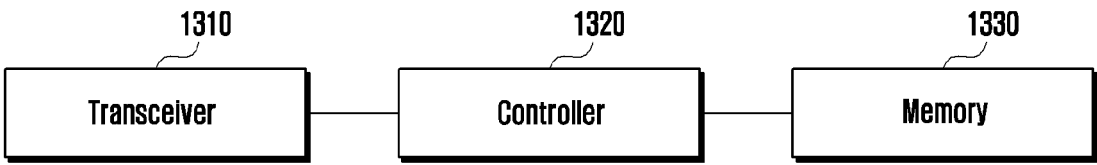
FIG. 13 is a block diagram of a terminal according to an embodiment of the disclosure.

FIG. 13 is a block diagram of a terminal according to an embodiment of the disclosure.

Referring to FIG. 13, a terminal includes a transceiver 1310, a controller 1320 and a memory 1330. The controller 1320 may refer to a circuitry, an application-specific integrated circuit (ASIC), or at least one processor. The transceiver 1310, the controller 1320 and the memory 1330 are configured to perform the operations of the UE described above. Although the transceiver 1310, the controller 1320 and the memory 1330 are shown as separate entities, they may be realized as a single entity like a single chip. Or, the transceiver 1310, the controller 1320 and the memory 1330 may be electrically connected to or coupled with each other.

The transceiver 1310 may transmit and receive signals to and from other network entities, e.g., a base station.

The controller 1320 may control the terminal to perform functions according to one of the embodiments described above. For example, the controller 1320 controls the transceiver 1310 and/or memory 1330 to perform paging related operations according to various embodiments of the disclosure.

In an embodiment, the operations of the terminal may be implemented using the memory 1330 storing corresponding program codes. Specifically, the terminal may be equipped with the memory 1330 to store program codes implementing desired operations. To perform the desired operations, the controller 1320 may read and execute the program codes stored in the memory 1330 by using at least one processor or a central processing unit (CPU).

Figure 14:
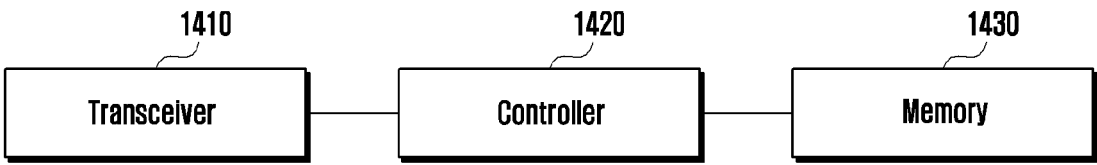
FIG. 14 is a block diagram of a base station according to an embodiment of the disclosure.

FIG. 14 is a block diagram of a base station according to an embodiment of the disclosure.

Referring to FIG. 14, a base station includes a transceiver 1410, a controller 1420 and a memory 1430. The controller 1420 may refer to a circuitry, an application-specific integrated circuit (ASIC), or at least one processor. The transceiver 1410, the controller 1420 and the memory 1430 are configured to perform the operations of the base station described above. Although the transceiver 1410, the controller 1420 and the memory 1430 are shown as separate entities, they may be realized as a single entity like a single chip. Or, the transceiver 1410, the controller 1420 and the memory 1430 may be electrically connected to or coupled with each other.

The transceiver 1410 may transmit and receive signals to and from other network entities, e.g., a terminal.

The controller 1420 may control the base station to perform functions according to one of the embodiments described above. For example, the controller 1420 controls the transceiver 1410 and/or memory 1430 to perform paging related operations according to various embodiments of the disclosure.

In an embodiment, the operations of the base station may be implemented using the memory 1430 storing corresponding program codes. Specifically, the base station may be equipped with the memory 1430 to store program codes implementing desired operations. To perform the desired operations, the controller 1420 may read and execute the program codes stored in the memory 1430 by using at least one processor or a central processing unit (CPU).

While the disclosure has been shown and described with reference to various embodiments thereof, it will be understood by those skilled in the art that various changes in form and details may be made therein without departing from the spirit and scope of the disclosure as defined by the appended claims and their equivalents.

As described above, embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

The invention claimed is:

1. A method performed by a terminal in a wireless communication system, the method comprising:
   receiving a radio resource control (RRC) release message with a suspend configuration including small data transmission (SDT) configuration information; and
   if an RRC resume procedure is initiated for an SDT, re-establishing a packet data convergence protocol (PDCP) entity for each of at least one radio bearer that is configured for the SDT,
   wherein the at least one radio bearer is configured for the SDT based on the SDT configuration information, and
   wherein if the RRC resume procedure is associated with a cell in which the RRC release message is received, a robust header compression (ROHC) protocol continues during re-establishing the PDCP entity.

2. The method of claim 1, wherein the SDT configuration information includes first information indicating at least one identifier (ID) of at least one data radio bearer (DRB) configured for the SDT.

3. The method of claim 1, wherein the SDT configuration information includes second information indicating whether a signaling radio bearer 2 (SRB2) is allowed for the SDT.

4. The method of claim 1, wherein the SDT configuration information includes third information indicating whether the PDCP entity continues or resets the ROHC protocol during re-establishing the PDCP entity.

5. The method of claim 4,
   wherein if the RRC resume procedure is initiated in a cell that is same as the cell in which the RRC release message is received, the ROHC protocol continues during re-establishing the PDCP entity according to the third information.

6. The method of claim 4, further comprising:
   wherein if the RRC resume procedure is initiated in a cell belonging to a same radio access network (RAN) based notification area (RNA) as the cell in which the RRC release message is received, the ROHC protocol continues during re-establishing the PDCP entity according to the third information.

7. The method of claim 1, further comprising:
   resuming the at least one radio bearer that is configured for the SDT; and
   transmitting an RRC resume request message or an RRC resume request 1 message.

8. A terminal in a wireless communication system, the terminal comprising:
   a transceiver; and
   a controller coupled with the transceiver and configured to:
      receive, via the transceiver, a radio resource control (RRC) release message with a suspend configuration including small data transmission (SDT) configuration information, and
      if an RRC resume procedure is initiated for an SDT, re-establish a packet data convergence protocol (PDCP) entity for each of at least one radio bearer that is configured for the SDT,
   wherein the at least one radio bearer is configured for the SDT based on the SDT configuration information, and
   wherein if the RRC resume procedure is associated with a cell in which the RRC release message is received, a robust header compression (ROHC) protocol continues during re-establishing the PDCP entity.

9. The terminal of claim 8, wherein the SDT configuration information includes first information indicating at least one identifier (ID) of at least one data radio bearer (DRB) configured for the SDT.

10. The terminal of claim 8, wherein the SDT configuration information includes second information indicating whether a signaling radio bearer 2 (SRB2) is allowed for the SDT.

11. The terminal of claim 8, wherein the SDT configuration information includes third information indicating whether the PDCP entity continues or resets the ROHC protocol during re-establishing the PDCP entity.

12. The terminal of claim 11,
   wherein if the RRC resume procedure is initiated in a same cell that is same as the cell in which the RRC release message is received, the ROHC protocol continue during re-establishing the PDCP entity according to the third information.

13. The terminal of claim 11,
   wherein if the RRC resume procedure is initiated in a cell belonging to a same radio access network (RAN) based notification area (RNA) as the cell in which the RRC release message is received, the ROHC protocol continues during re-establishing the PDCP entity according to the third information.

14. The terminal of claim 8, wherein the controller is further configured to:

resume the at least one radio bearer that is configured for the SDT.

15. The terminal of claim 8, wherein the controller is further configured to:

transmit, via the transceiver, an RRC resume request message or an RRC resume request 1 message.

* * * * *